(12) United States Patent
Ito et al.

(10) Patent No.: US 11,185,397 B2
(45) Date of Patent: Nov. 30, 2021

(54) WORKPIECE UNIT AND METHOD FOR PRODUCING SAME

(71) Applicant: KURARAY NORITAKE DENTAL INC., Kurashiki (JP)

(72) Inventors: Yoshihisa Ito, Miyoshi (JP); Yoshihisa Yamada, Miyoshi (JP); Naofumi Murata, Chiyoda-ku (JP)

(73) Assignee: KURARAY NORITAKE DENTAL INC., Kurashiki (JP)

( * ) Notice: Subject to any disclaimer, the term of this patent is extended or adjusted under 35 U.S.C. 154(b) by 141 days.

(21) Appl. No.: 15/559,102

(22) PCT Filed: Mar. 18, 2016

(86) PCT No.: PCT/JP2016/058767
§ 371 (c)(1),
(2) Date: Sep. 18, 2017

(87) PCT Pub. No.: WO2016/148289
PCT Pub. Date: Sep. 22, 2016

(65) Prior Publication Data
US 2018/0243054 A1    Aug. 30, 2018

(30) Foreign Application Priority Data

Mar. 19, 2015 (JP) .............................. JP2015-056572

(51) Int. Cl.
*A61C 13/00*      (2006.01)
*A61C 7/14*      (2006.01)
(Continued)

(52) U.S. Cl.
CPC ............ *A61C 13/0022* (2013.01); *A61C 5/77* (2017.02); *A61C 7/14* (2013.01); *A61C 8/00* (2013.01);
(Continued)

(58) Field of Classification Search
None
See application file for complete search history.

(56) References Cited

U.S. PATENT DOCUMENTS

| 5,939,211 A | 8/1999 | Mormann |
| 6,482,284 B1 | 11/2002 | Reidt et al. |
(Continued)

FOREIGN PATENT DOCUMENTS

| CN | 1479593 | 3/2004 |
| DE | 20316004 | 3/2004 |
(Continued)

OTHER PUBLICATIONS

Machine translation of JP 201002610. (Year: 2010).*
(Continued)

*Primary Examiner* — David Sample
*Assistant Examiner* — Elizabeth Collister
(74) *Attorney, Agent, or Firm* — Oblon, McClelland, Maier & Neustadt, L.L.P.

(57) ABSTRACT

A workpiece unit containing a workpiece body is provided. A method for producing the workpiece unit is also provided. The workpiece body contains a plurality of sections. The sections divide the processing surface of the workpiece body. The size of each section of the workpiece body can be adjusted or selected according to the demand so that it is possible to increase utilization efficiency of the workpiece body.

14 Claims, 21 Drawing Sheets

(51) Int. Cl.
  *A61C 13/083* (2006.01)
  *A61C 5/77* (2017.01)
  *A61C 8/00* (2006.01)
  *B29C 65/66* (2006.01)
  *B29L 31/00* (2006.01)

(52) U.S. Cl.
  CPC .......... *A61C 13/083* (2013.01); *B29C 65/665* (2013.01); *B29L 2031/7536* (2013.01)

(56) References Cited

U.S. PATENT DOCUMENTS

| | | | |
|---|---|---|---|
| 6,627,327 | B2 | 9/2003 | Reidt et al. |
| 8,506,294 | B2 | 8/2013 | Althoff et al. |
| 9,212,065 | B2 | 12/2015 | Yamada et al. |
| 9,260,342 | B2 | 2/2016 | Borczuch-Laczka et al. |
| 9,688,568 | B2 | 6/2017 | Borczuch-Laczka et al. |
| 2003/0073394 | A1 | 4/2003 | Reidt et al. |
| 2003/0132539 | A1 | 7/2003 | Althoff et al. |
| 2010/0028836 | A1* | 2/2010 | Gubler ............... A61C 5/77 433/223 |
| 2013/0224454 | A1* | 8/2013 | Jung ............... A61C 13/0004 428/213 |
| 2014/0141960 | A1 | 5/2014 | Borczuch-Laczka et al. |
| 2014/0328746 | A1 | 11/2014 | Yamada et al. |
| 2016/0159682 | A1 | 6/2016 | Borczuch-Laczka et al. |
| 2017/0189146 | A1* | 7/2017 | Volkl ............... A61C 13/081 |

FOREIGN PATENT DOCUMENTS

| | | | |
|---|---|---|---|
| DE | 10 2007 013 675 A1 | 10/2008 | |
| DE | 20 2013 103 515 U1 | 11/2013 | |
| DE | 102015122865 A1 * | 6/2017 | ............... A61C 5/77 |
| JP | 3-36135 U | 4/1991 | |
| JP | 10-94551 A | 4/1998 | |
| JP | 2004-507316 A | 3/2004 | |
| JP | 2007-054651 A | 3/2007 | |
| JP | 2010-022610 A | 2/2010 | |
| JP | 2014-515722 A | 7/2014 | |
| JP | 2014-218389 A | 11/2014 | |
| WO | 95/30382 A1 | 11/1995 | |
| WO | 2009/154301 A1 | 12/2009 | |
| WO | 2011/029615 A1 | 3/2011 | |
| WO | WO 2013/072267 A1 | 5/2013 | |
| WO | 2013/117540 A1 | 8/2013 | |
| WO | WO2014/181828 | 11/2014 | |

OTHER PUBLICATIONS

Machine translation of DE 202013103515U1. (Year: 2013).*
International Preliminary Report on Patentability and Written Opinion dated Sep. 28, 2017 in PCT/JP2016/058767 (Submitting English language translation only).
International Search Report dated May 24, 2016, in PCT/JP2016/058767 filed Mar. 18, 2016.
Extended European Search Report dated Sep. 14. 2018 in European Patent Application No. 16765118.1, citing documents AA, AO, AP and AQ therein, 8 pages.
Office Action in Chinese corresponding application No. 201680016778.9 dated Nov. 22, 2019. (w/English Translation).
Office Action in corresponding Japanese Patent Application No. 2017-506224 dated Jun. 30, 2021. (w/English Machine Translation).

* cited by examiner

[Fig. 1]
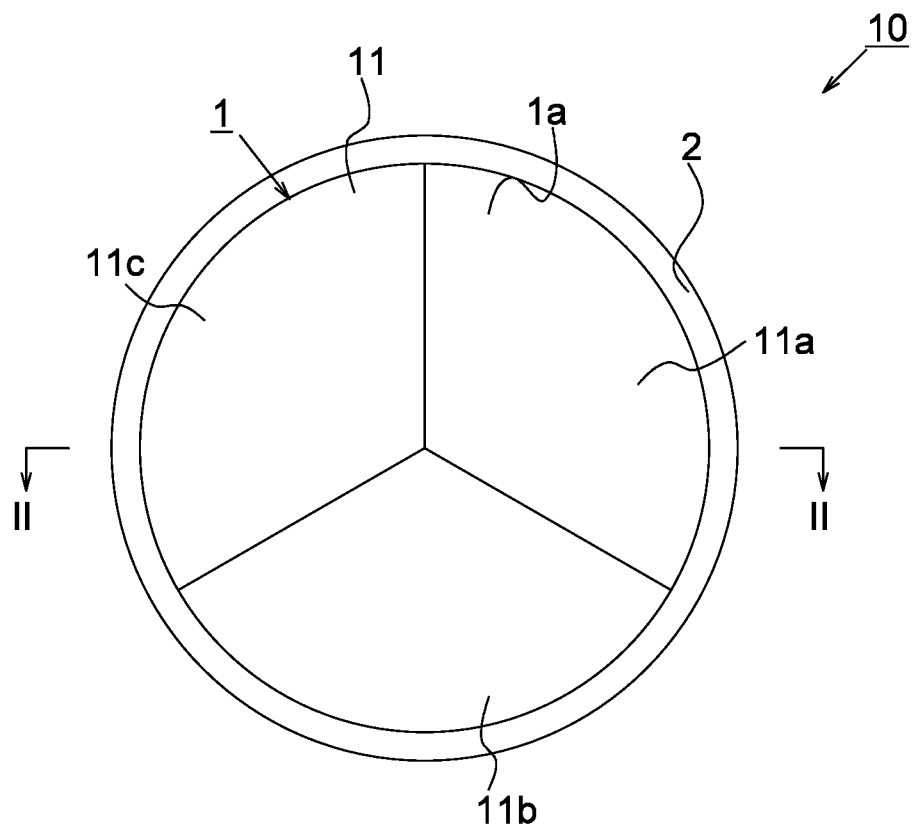
[Fig. 2]
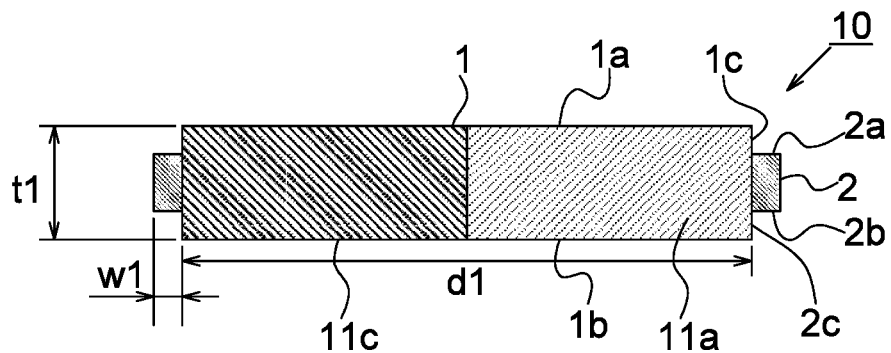

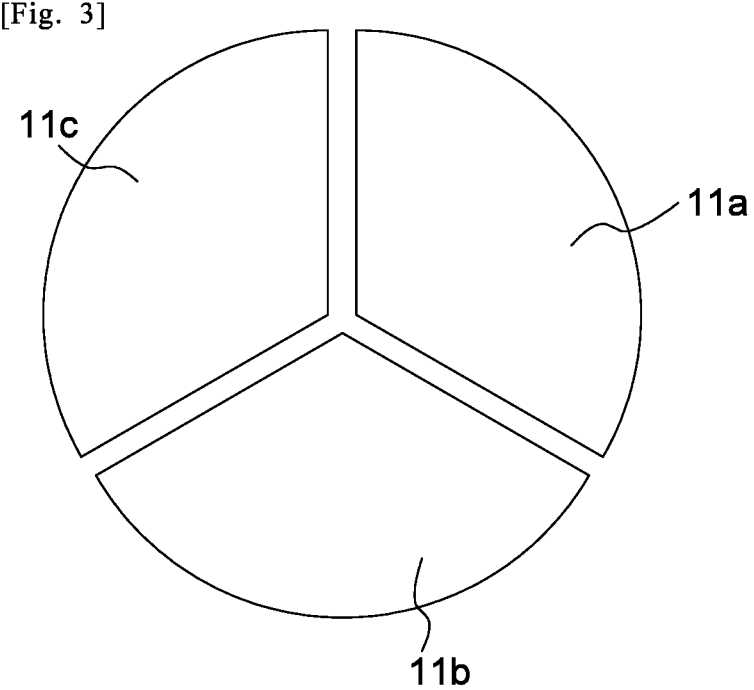
[Fig. 3]
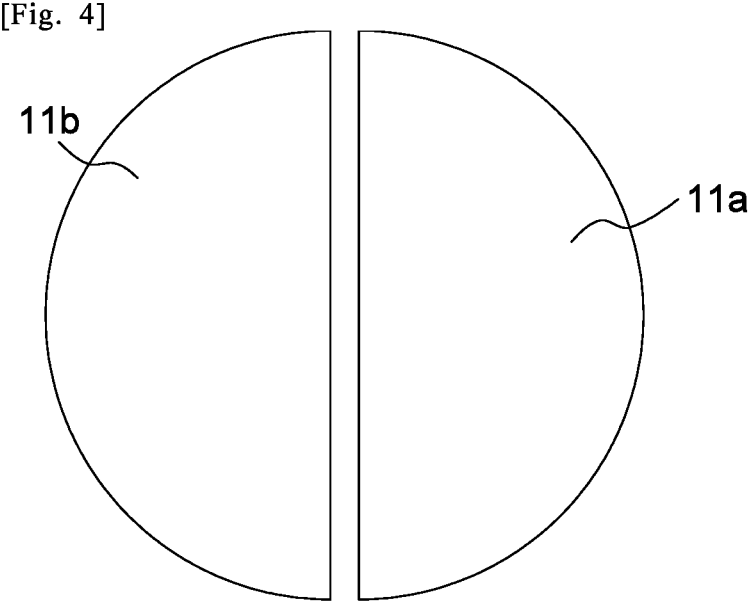
[Fig. 4]

[Fig. 5]
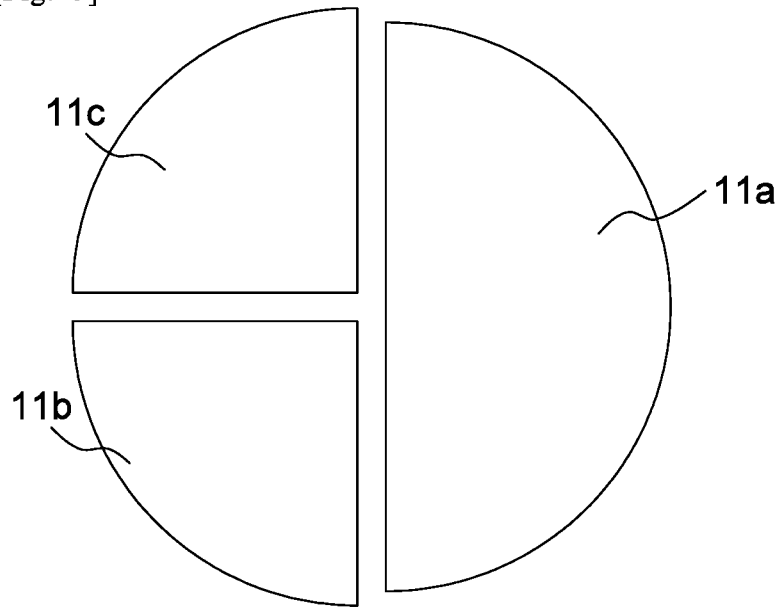
[Fig. 6]
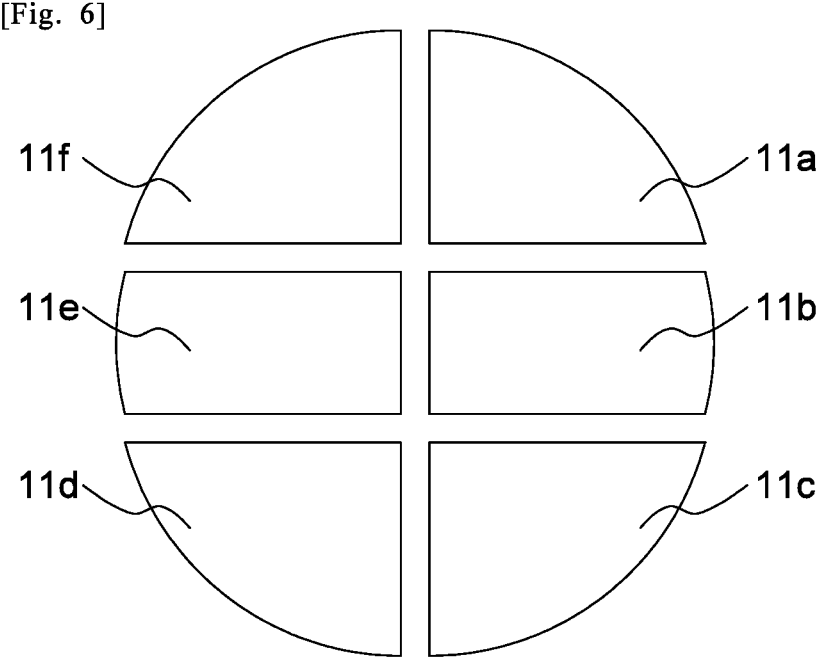

[Fig. 7]
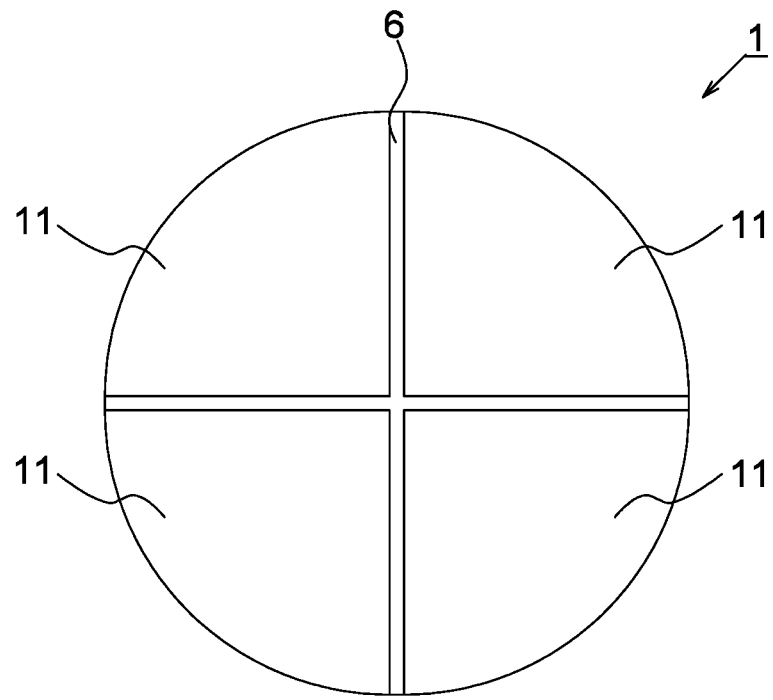
[Fig. 8]
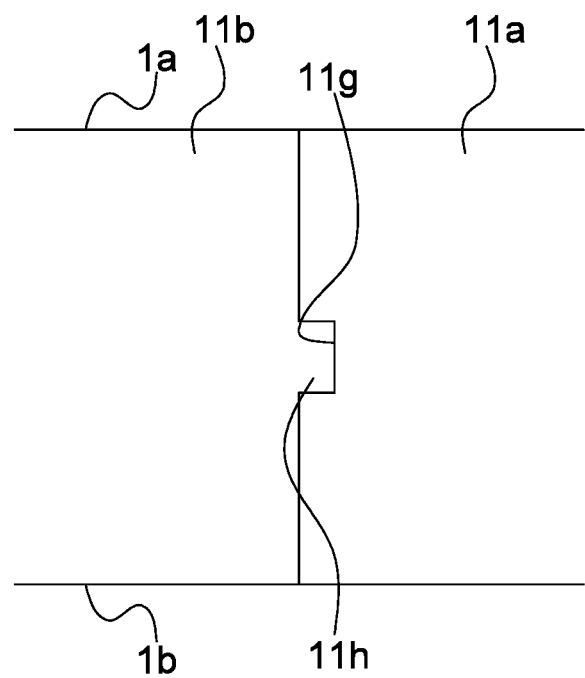

[Fig. 9]
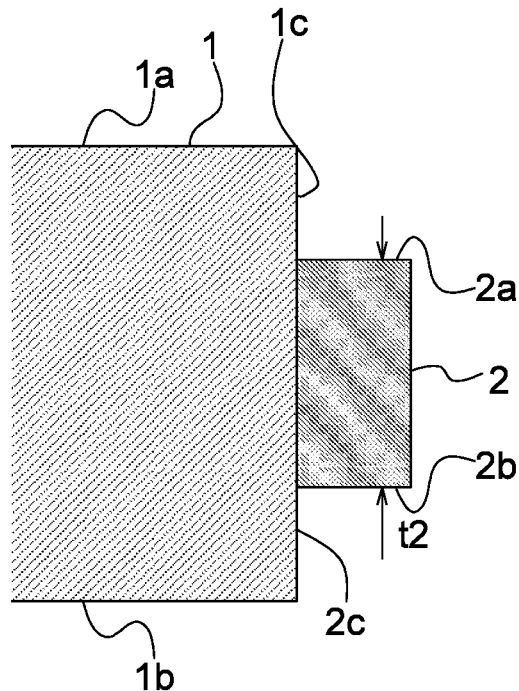
[Fig. 10]
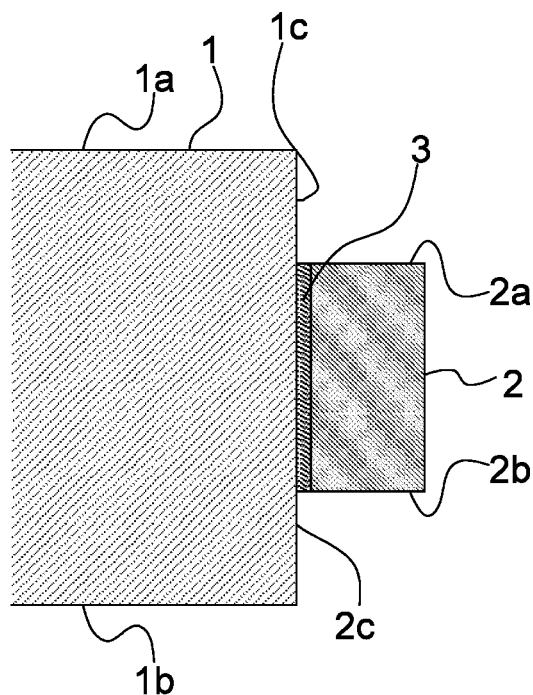

[Fig. 11]
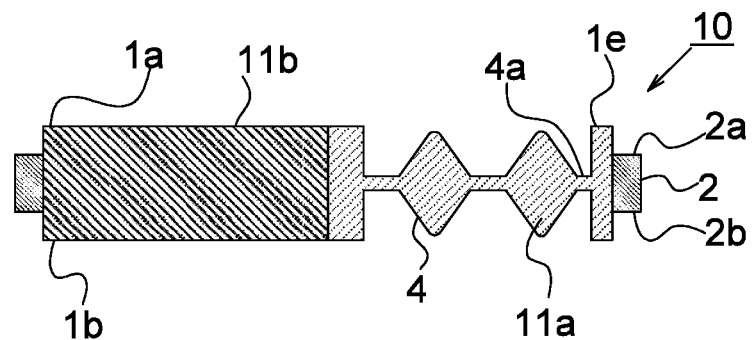
[Fig. 12]
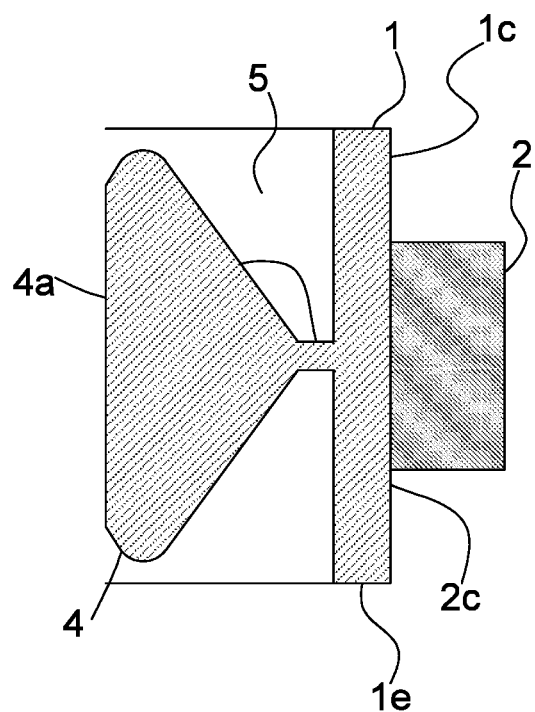

[Fig. 13]
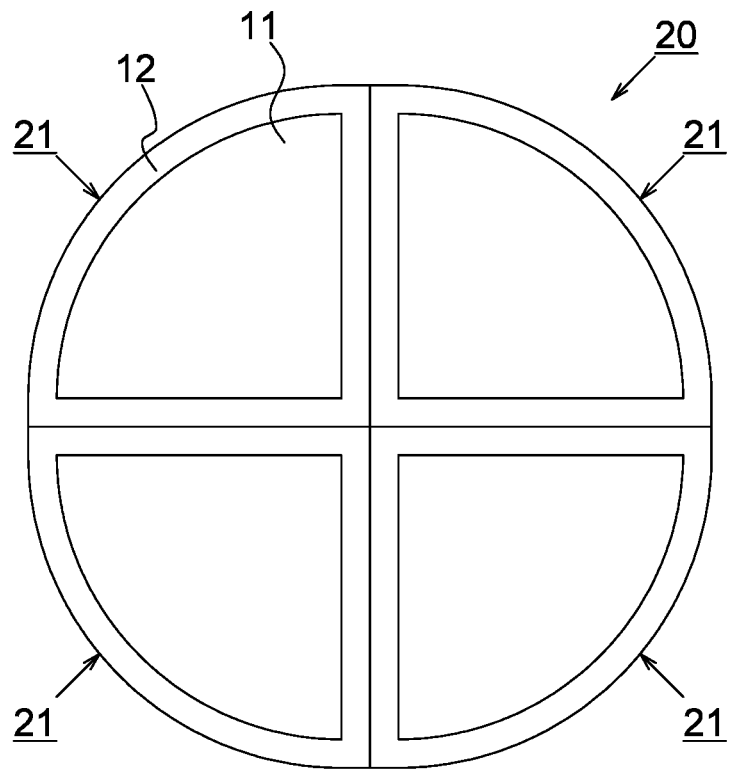
[Fig. 14]
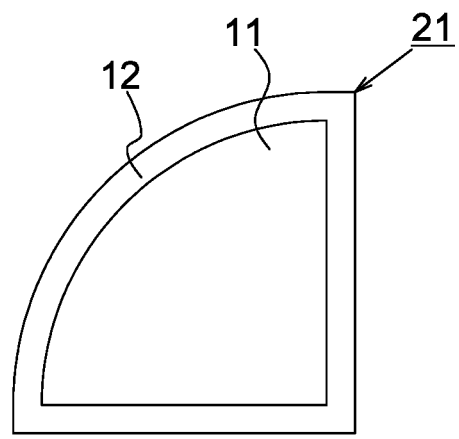

[Fig. 15]
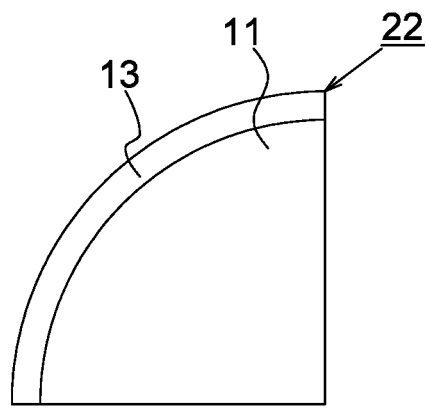
[Fig. 16]
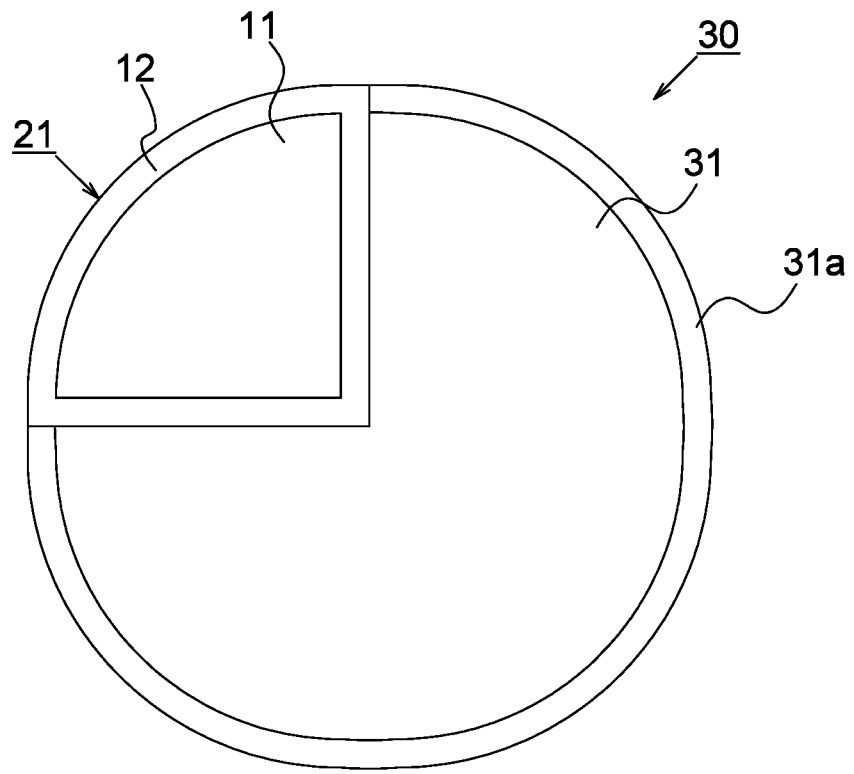

[Fig. 17]
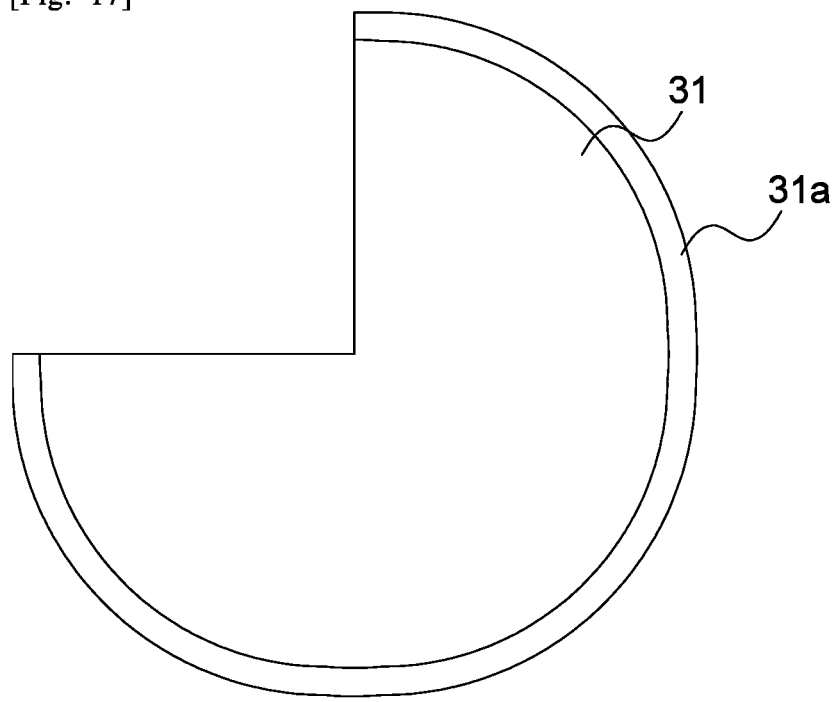
[Fig. 18]
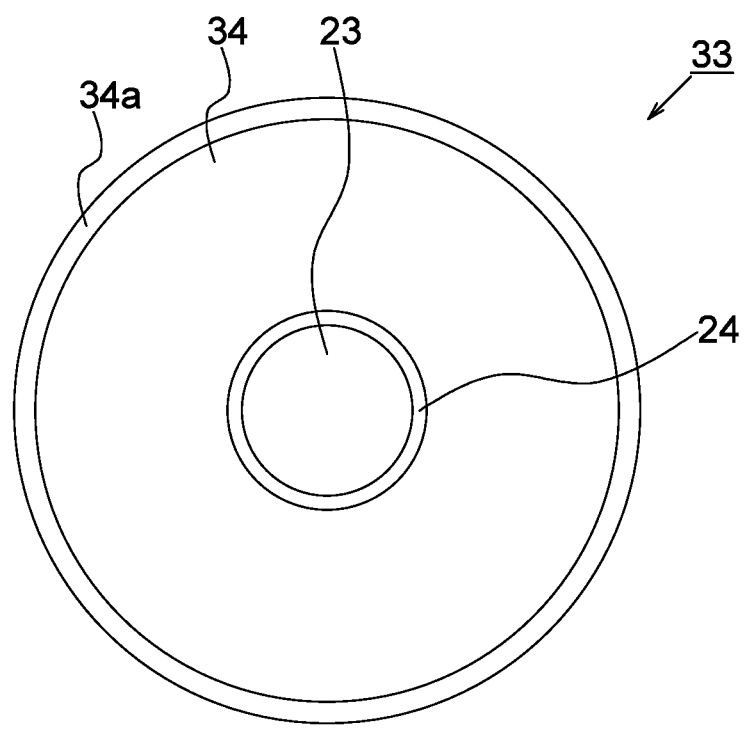

[Fig. 19]
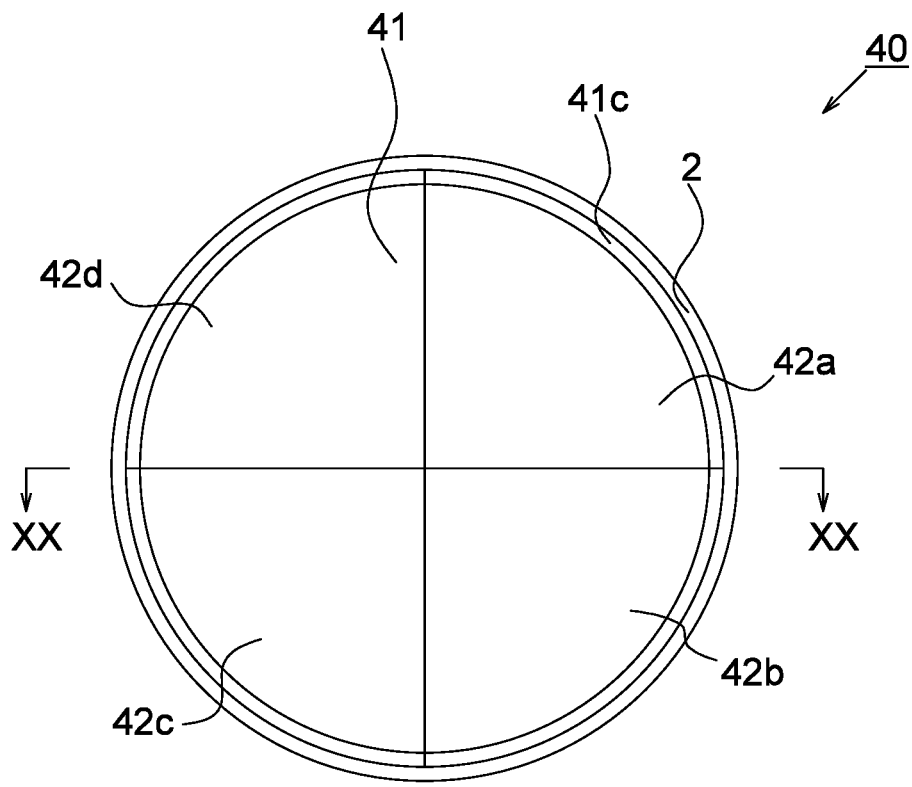
[Fig. 20]
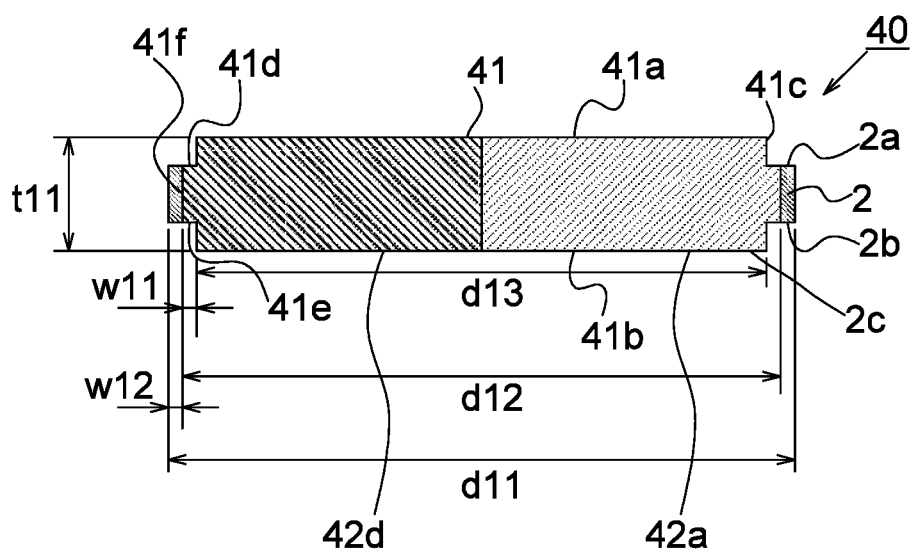

[Fig. 21]
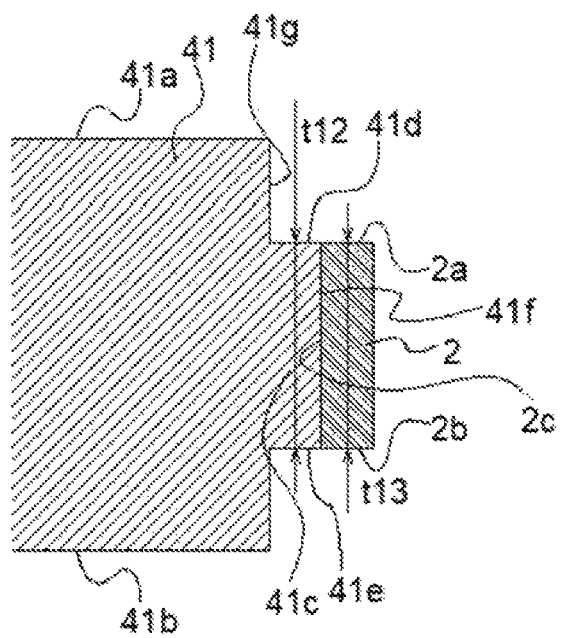
[Fig. 22]
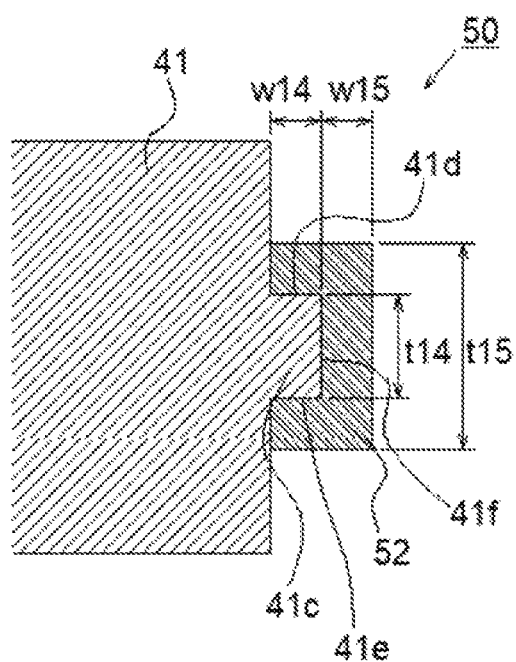

[Fig. 23]
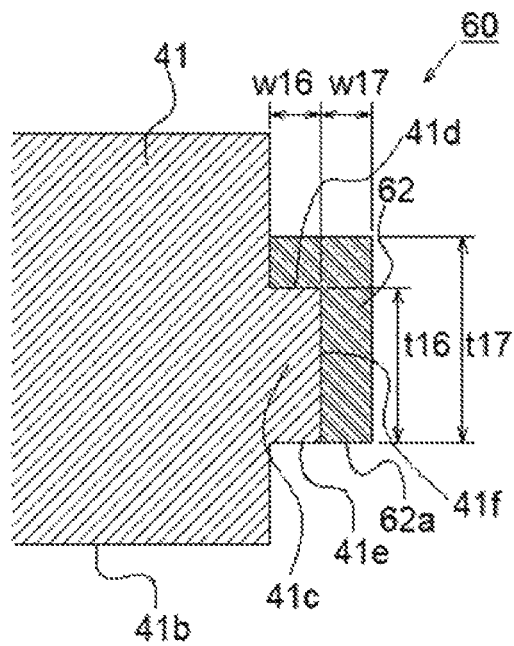
[Fig. 24]
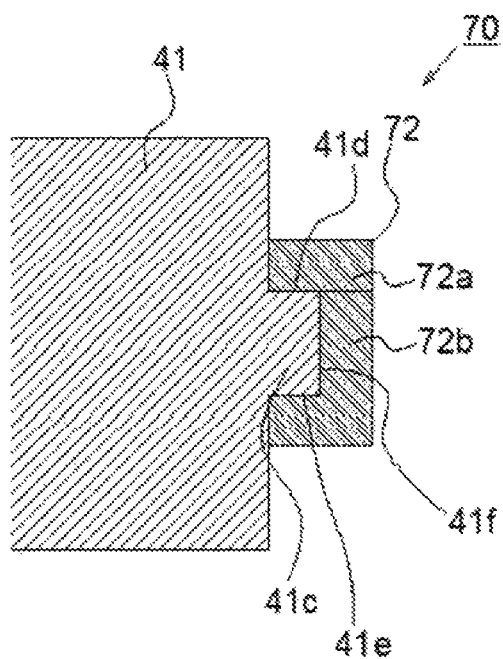

[Fig. 25]
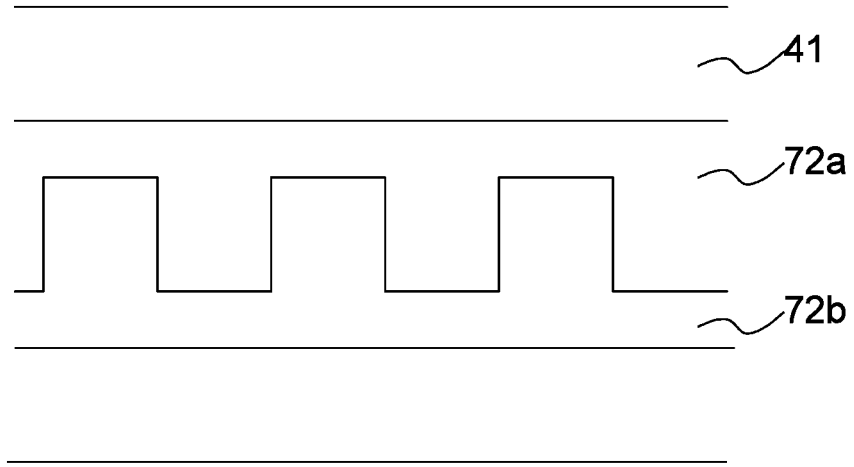
[Fig. 26]
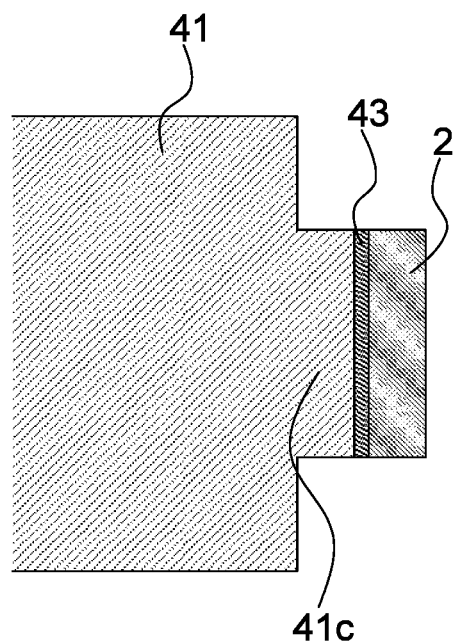

[Fig. 27]
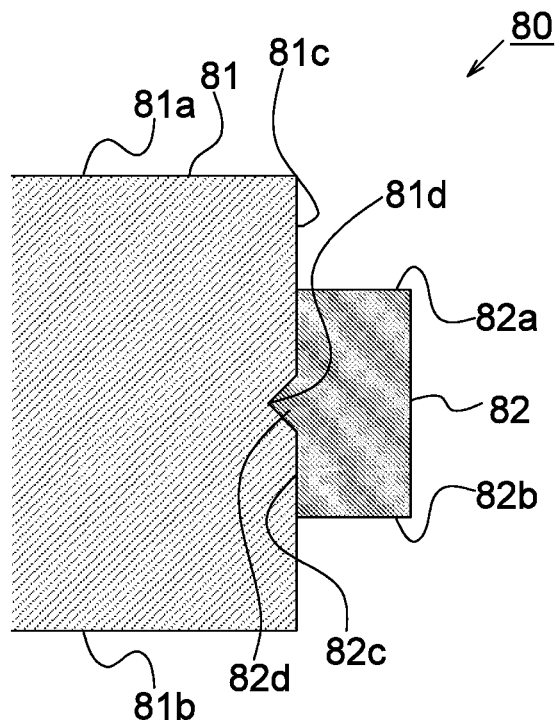
[Fig. 28]
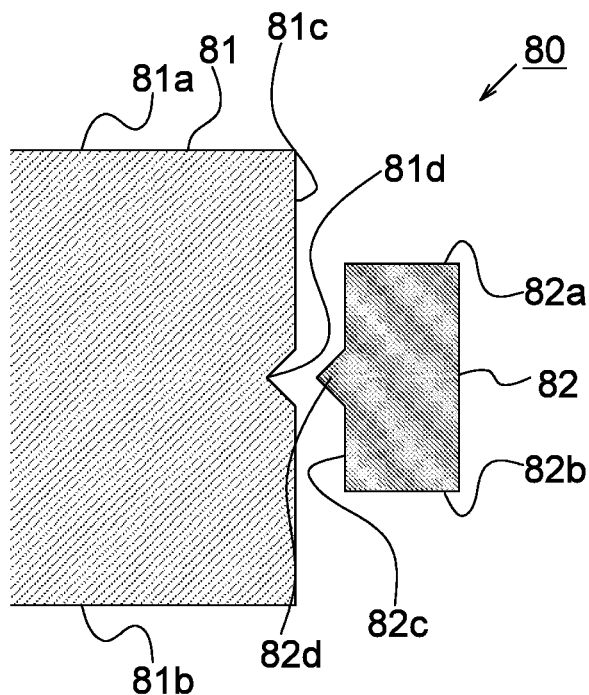

[Fig. 29]
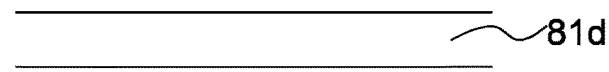
[Fig. 30]
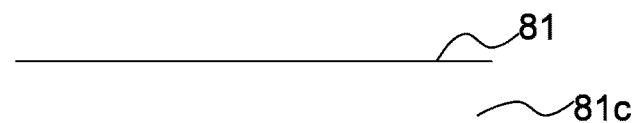
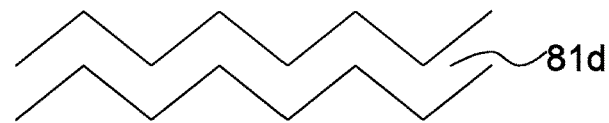
[Fig. 31]

[Fig. 32]
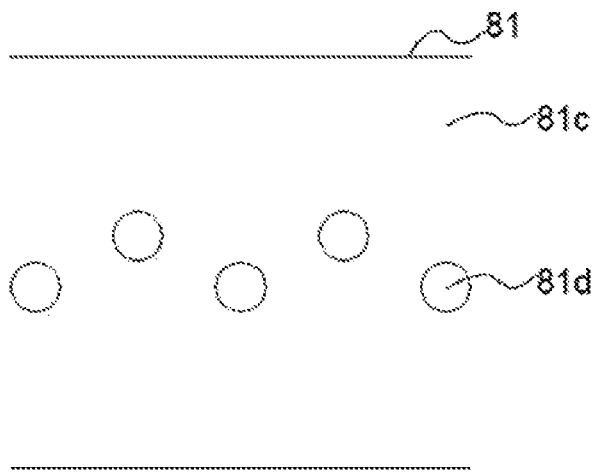
[Fig. 33]
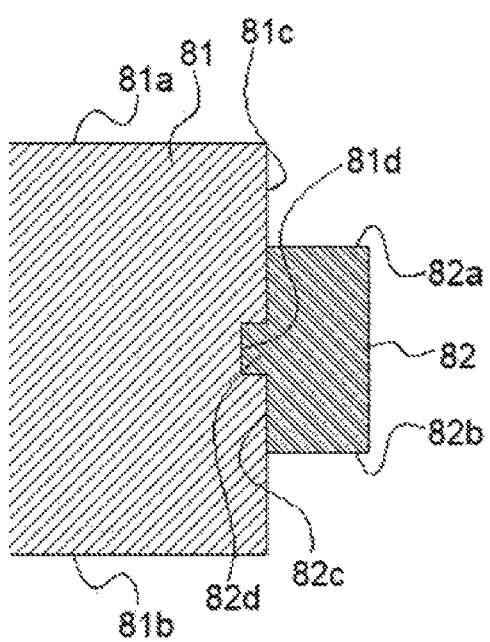

[Fig. 34]
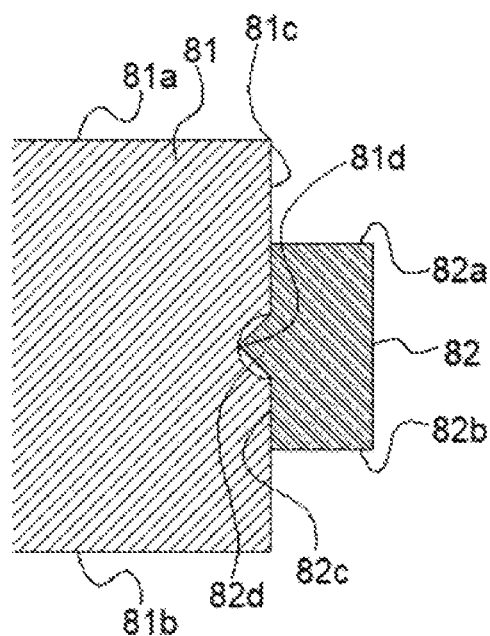
[Fig. 35]
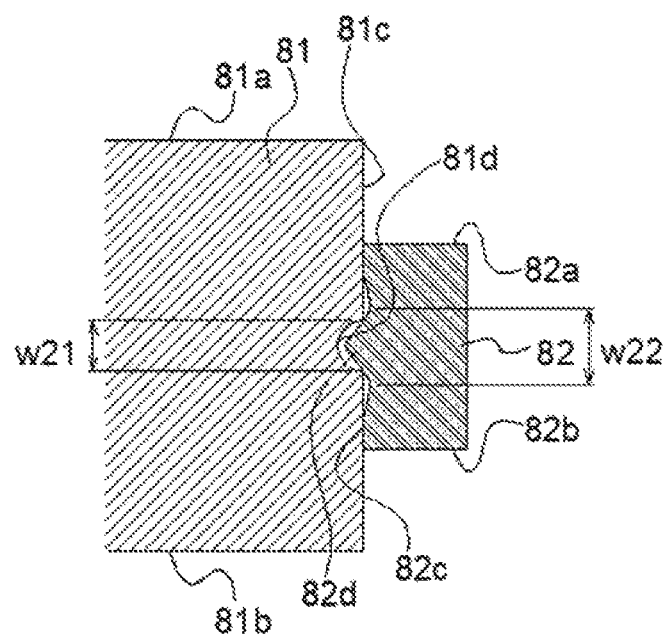

[Fig. 36]
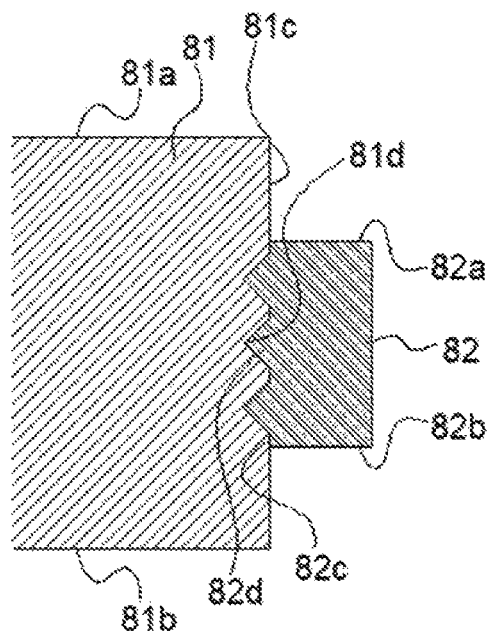
[Fig. 37]
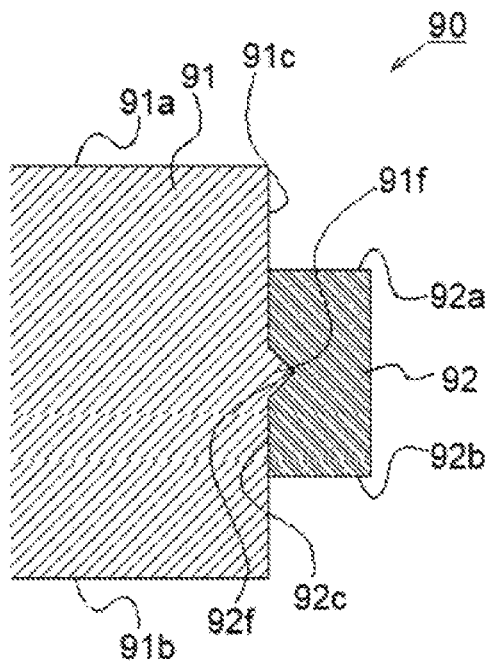

[Fig. 38]
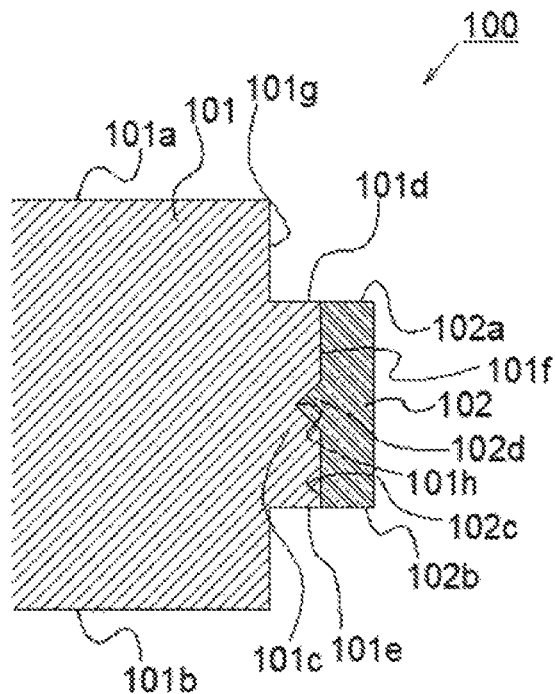
[Fig. 39]
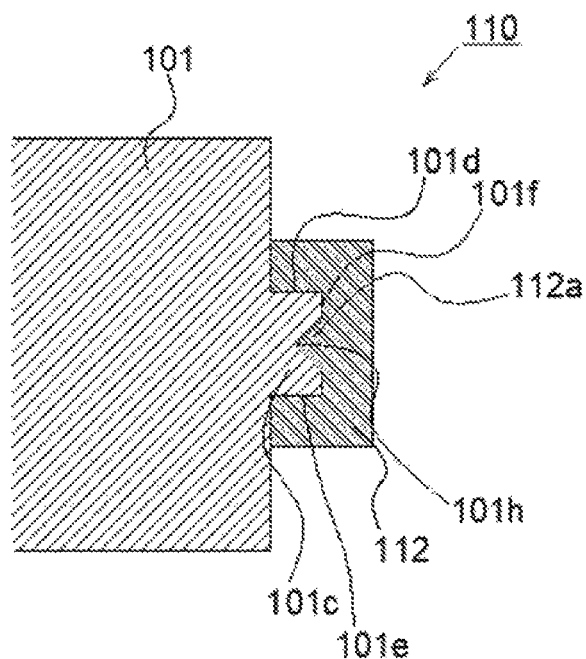

[Fig. 40]
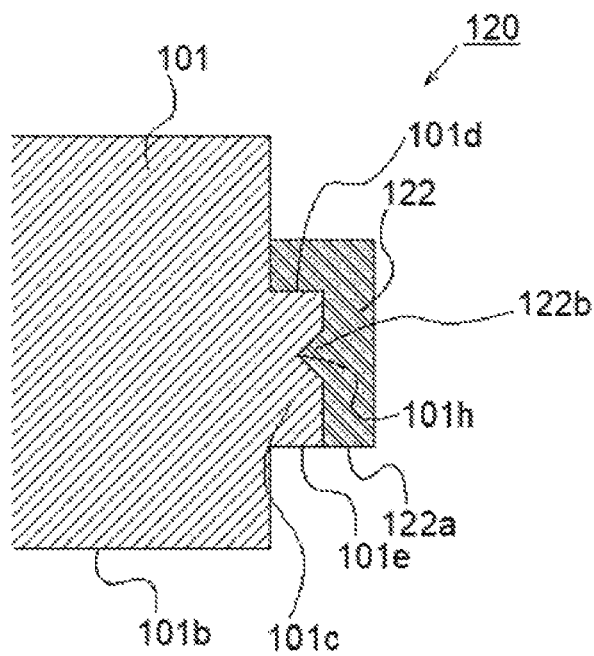
[Fig. 41]
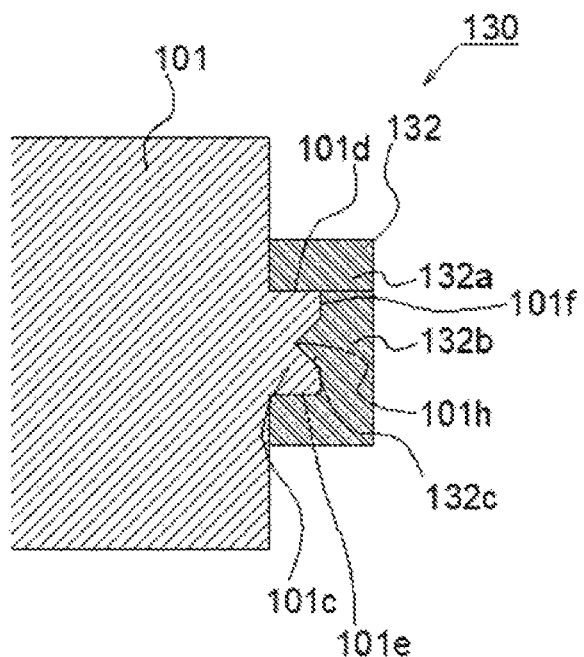

[Fig. 42]
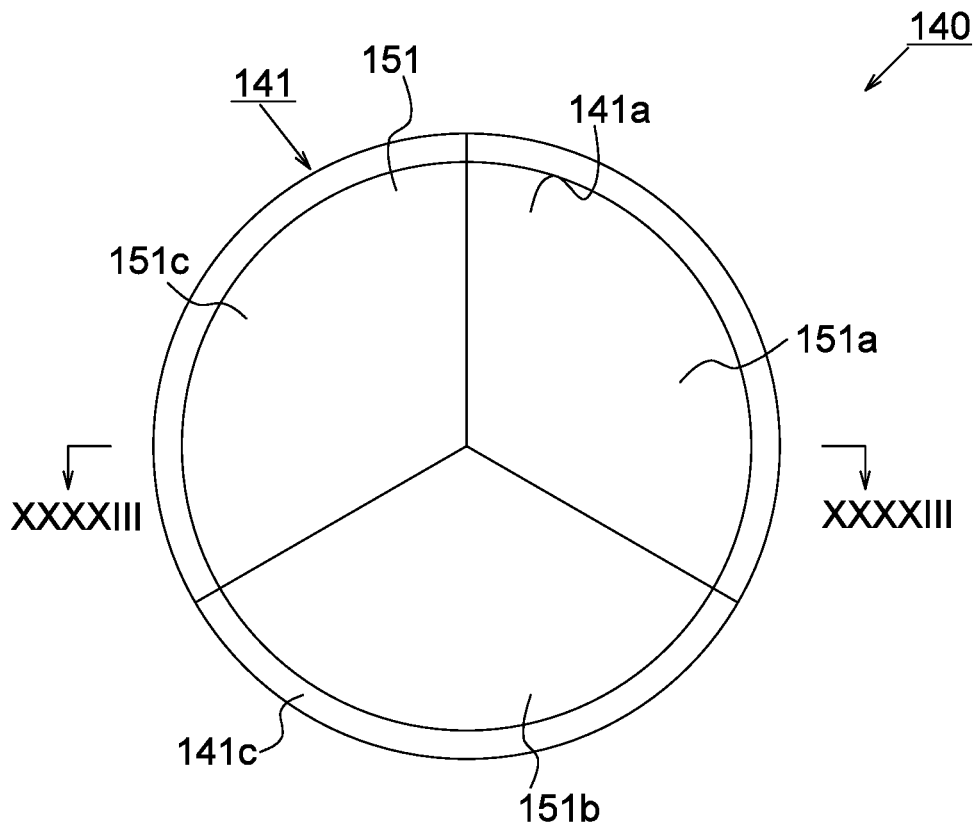
[Fig. 43]
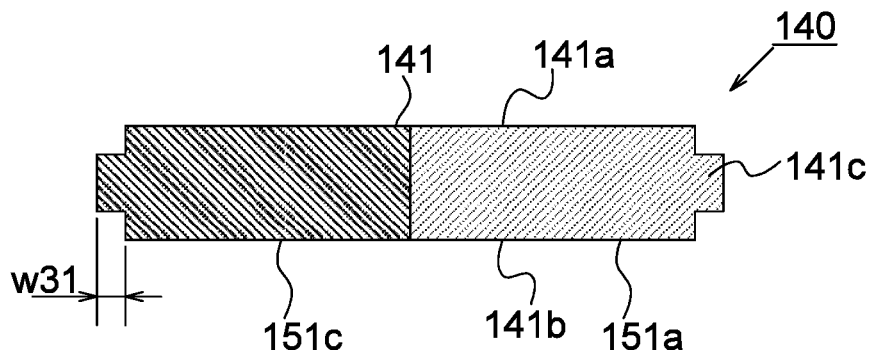

WORKPIECE UNIT AND METHOD FOR PRODUCING SAME

REFERENCE TO RELATED APPLICATION

The present invention is based upon the priority of Japanese patent application No. 2015-056572 filed on Mar. 19, 2015, the disclosure of which is incorporated herein in its entirety by reference thereto.

TECHNICAL FIELD

The present invention relates a workpiece comprising a workpiece body for machining processing and a method for producing same.

BACKGROUND

In machining processing of workpiece body such as ceramic, metal etc. into three-dimensional shape, a workpiece unit is machined by holding ends thereof. This workpiece body is referred to also as "blank". For example, in the dental industry, an outer edge region of a circular plate (disk) shaped zirconia dedicated as a workpiece body is held by a processing apparatus and the prosthesis is cut out.

In a method for producing a dental prosthesis described in Patent Literature 1 (PTL 1), a blank is fixed to a processing apparatus by attaching a ring to an outer edge of a blank by means of an adhesive and fixing the ring to a chuck of a processing apparatus.

PTL 1: WO95/30382A

SUMMARY

The following analyses are given in view of the present invention disclosure.

For example, when a workpiece body (blank) or a product made from the workpiece body is colored, the composition of the workpiece body differs from color to color. The workpiece body described in PTL 1 has one composition for each workpiece body surrounded by the ring. When a dental prosthesis is produced from the workpiece body described in PTL 1, the workpiece body having a color (composition) corresponding to a color of a patient's natural tooth is selected. The workpiece is formed to a predetermined size suitable for the processing apparatus. Usually, it is possible to produce a plurality of dental prostheses having the same composition from one workpiece body. However, even when the demand for the workpiece body (for example, composition and color) is small, that is, even when the size required to produce the prosthesis may be small, the workpiece body described in PTL 1 must be produced in the predetermined size. For this reason, most of part of the workpiece body not used for processing is wasted.

Therefore, it is desired that the workpiece body can be used efficiently according to the demand for the composition.

According to a first aspect of the present disclosure, a workpiece unit is provided that comprises a workpiece body (a to-be-worked body) having a plurality of sections. The sections divide processing surface (surface-to-be-worked) of the workpiece body.

According to a second aspect of the present disclosure, a method for producing a workpiece unit is provided, comprising:

preparing a plurality of sections dedicated to be components of a workpiece body, making the workpiece body having a first surface, a second surface arranged on a side opposite to the first surface and an outer circumferential portion provided between the first surface and the second surface, by combining a plurality of the sections, preparing a holding member having a ring shape, expanding the holding member by heating, inserting the workpiece body into a ring of the holding member, and mounting the holding member to the outer circumferential portion of the workpiece body, by allowing the holding member to cool and shrink.

The size of each section of the workpiece body can be adjusted or selected according to the demand such as composition and color etc. As a result, it is possible to reduce the portion that is not used for processing and is wasteful, and it is possible to increase utilization efficiency of the workpiece body.

BRIEF DESCRIPTION OF DRAWINGS

FIG. 1 is a schematic plan view showing a workpiece unit according to a first exemplary embodiment of the present disclosure.

FIG. 2 is a schematic cross-sectional view of the workpiece unit along line II-II of FIG. 1.

FIG. 3 is a schematic plan view of an example of a section.

FIG. 4 is a schematic plan view showing an example of a section.

FIG. 5 is a schematic plan view showing an example of a section.

FIG. 6 is a schematic partial cross-sectional view of the workpiece unit according to the first exemplary embodiment of the present disclosure.

FIG. 7 is a schematic partial cross-sectional view showing the workpiece unit according to the first exemplary embodiment of the present disclosure.

FIG. 8 is a schematic side view of the workpiece body showing another example of the workpiece body.

FIG. 9 is a schematic partial cross-sectional view of the workpiece unit according to the first exemplary embodiment.

FIG. 10 is a schematic partial cross-sectional view of the workpiece unit according to the first exemplary embodiment.

FIG. 11 is a schematic sectional view of the workpiece unit after processing the workpiece body.

FIG. 12 is a schematic partial cross-sectional view of the workpiece unit shown in FIG. 11.

FIG. 13 is a schematic plan view of a workpiece unit according to a second exemplary embodiment of the present disclosure.

FIG. 14 is a schematic plan view showing a section unit according to the second exemplary embodiment of the present disclosure.

FIG. 15 is a schematic plan view of the section unit according to another mode.

FIG. 16 is a schematic plan view of a workpiece unit according to a third exemplary embodiment of the present disclosure.

FIG. 17 is a schematic plan view showing a dummy workpiece body.

FIG. 18 is a schematic plan view showing a workpiece unit according to a third exemplary embodiment of the present disclosure.

FIG. 19 is a schematic plan view showing a workpiece unit according to a fourth exemplary embodiment of the present disclosure.

FIG. 20 is a schematic cross-sectional view showing the workpiece unit along line XX-XX of FIG. 19.

FIG. 21 is a schematic partial cross-sectional view showing a holding member and a protrusion portion.

FIG. 22 is a schematic partial cross-sectional view showing the holding member and the protrusion portion.

FIG. 23 is a schematic partial sectional view showing the holding member and the protrusion portion.

FIG. 24 is a schematic partial sectional view showing the holding member and the protrusion portion.

FIG. 25 is a schematic partial sectional view showing the holding member and the protrusion portion.

FIG. 26 is a schematic partial sectional view showing a workpiece unit according to the fourth exemplary embodiment of the present disclosure.

FIG. 27 is a schematic partial sectional view showing a workpiece unit according to a fifth exemplary embodiment of the present disclosure.

FIG. 28 is a schematic exploded cross-sectional view showing the workpiece body and the holding member shown in FIG. 27.

FIG. 29 is a schematic plan view showing an example of a first positioning portion and a second positioning portion.

FIG. 30 is a schematic plan view showing an example of a first positioning portion and a second positioning portion.

FIG. 31 is a schematic plan view showing an example of a first positioning portion and a second positioning portion.

FIG. 32 is a schematic plan view showing an example of a first positioning portion and a second positioning portion.

FIG. 33 is a schematic plan view showing an example of a first positioning portion and a second positioning portion.

FIG. 34 is a schematic plan view showing an example of a first positioning portion and a second positioning portion.

FIG. 35 is a schematic plan view showing an example of a first positioning portion and a second positioning portion.

FIG. 36 is a schematic plan view showing an example of a first positioning portion and a second positioning portion.

FIG. 37 is a schematic partial cross-sectional view showing a workpiece unit according to a sixth exemplary embodiment of the present disclosure.

FIG. 38 is a schematic partial cross-sectional view showing a workpiece unit according to a seventh exemplary embodiment of the present disclosure.

FIG. 39 is a schematic partial cross-sectional view showing the workpiece unit according to the seventh exemplary embodiment of the present disclosure.

FIG. 40 is a schematic partial cross-sectional view showing the workpiece unit according to the seventh exemplary embodiment of the present disclosure.

FIG. 41 is a schematic partial cross-sectional view showing the workpiece unit according to the seventh exemplary embodiment of the present disclosure.

FIG. 42 is a schematic plan view showing a workpiece unit according to a ninth exemplary embodiment of the present disclosure.

FIG. 43 is a schematic cross-sectional view showing the workpiece unit along line XXXXIII-XXXXIII of FIG. 42.

PREFERRED MODES

In the following description, the reference numbers are added for understanding the present invention, but not for limitation of the invention to the exemplary embodiments shown in the drawings. In each exemplary embodiment, the same numbers are added to the same elements. The dimensions and the size ratios in the drawings are not for limitation to the modes shown in the drawings.

Preferable modes of the above aspects will be described below.

According to a preferred mode of the above first aspect, a plurality of sections is formed integrally.

According to a preferred mode of the above first aspect, a plurality of the sections has the same shape respectively.

According to a preferred mode of the above first aspect, a workpiece unit further comprises a holding member surrounding at least an outer circumferential portion of a workpiece body.

According to a preferred mode of the above first aspect, the workpiece body is divided per sections.

According to a preferred mode of the above first aspect, at least two of the sections have different compositions.

According to a preferred mode of the above first aspect, the section(s) has (have) form(s) engaging with adjacent section(s).

According to a preferred mode of the above first aspect, the workpiece unit further comprises a cushioning (or buffer) material arranged between adjacent sections.

According to a preferred mode of the above first aspect, the cushioning material comprises a resin.

According to a preferred mode of the above first aspect, the holding member maintains a combination (combined assembly) of a plurality of sections.

According to a preferred mode of the above first aspect, the holding member is composed of a plurality of portions. The portions of the holding member are arranged in each section of the workpiece body respectively.

According to a preferred mode of the above first aspect, the workpiece unit further comprises a covering member surrounding the outer circumferential portion(s) of the section(s).

According to a preferred mode of the above first aspect, portion(s) of the holding member is (are) at least a part of the covering member.

According to a preferred mode of the above first aspect, the covering member has a shape that engages with a covering member surrounding adjacent section(s).

According to a preferred mode of the above first aspect, the holding member is arranged continuously along an outer circumferential portion.

According to a preferred mode of the above first aspect, the holding member has a ring shape.

According to a preferred mode of the above first aspect, the holding member has a thickness smaller than that of the workpiece body.

According to a preferred mode of the above first aspect, the holding member is arranged at a central area in the thickness direction of the workpiece body.

According to a preferred mode of the above first aspect, the holding member is composed of two or more parts.

According to a preferred mode of the above first aspect, each of parts of the holding member has a concave portion or a convex portion respectively. The parts are arranged so as to fit together with the concave portion and the convex portion.

According to a preferred mode of the above first aspect, the holding member is plastic.

According to a preferred mode of the above first aspect, the workpiece body has at least one first positioning portion in a portion facing the holding member. The holding member has a second positioning portion that engages with at least a part of the first positioning portion.

According to a preferred mode of the above first aspect, the first positioning portion has a concave or convex shape. The second positioning portion has a shape fitting or engaging with the first positioning portion. At least a part of one of the first positioning portion and the second positioning portion is fitted or engaged with at least a part of the other.

According to a preferred mode of the above first aspect, one of the first positioning portion and the second positioning portion has the concave shape and the other has the convex shape. The convex shape has a width equal or larger than that of the concave shape. A part of the convex shape is inserted in the concave shape.

According to a preferred mode of the above first aspect, the first positioning portion is arranged over the entire circumference of the workpiece body.

According to a preferred mode of the above first aspect, the first positioning portion or the second positioning portion has a groove shape.

According to a preferred mode of the above first aspect, the first positioning portion or the second positioning portion has a conical or columnar shape.

According to a preferred mode of the above first aspect, the holding member is bonded to the workpiece body by an adhesive.

According to a preferred mode of the above first aspect, the holding member and the workpiece body are in direct contact with each other.

According to a preferred mode of the above first aspect, the workpiece body has a first surface dedicated as a processed surface, a second surface arranged on a side opposite to the first surface and a protrusion arranged on an outer circumferential portion provided between the first surface and the second surface.

According to a preferred mode of the above first aspect, the workpiece body has a plate shape. The protrusion protrudes from a side surface of the workpiece body.

According to a preferred mode of the above first aspect, the protrusion has a third surface directed in the same direction as the first surface, a fourth surface directed in the same direction as the second surface and a fifth surface connecting the third surface and the fourth surface.

According to a preferred mode of the above first aspect, the workpiece body has a first surface dedicated as a processed surface, a second surface arranged on a side opposite to the first surface and a protrusion arranged on an outer circumferential portion provided between the first surface and the second surface. The holding member is arranged on at least a part of the outer side of the protrusion.

According to a preferred mode of the above first aspect, the workpiece body has a plate shape. The protrusion protrudes from a side surface of the workpiece body. The holding member is arranged at least in a protruding direction of the protrusion.

According to a preferred mode of the above first aspect, the protrusion has a third surface directed in the same direction as the first surface, a fourth surface directed in the same direction as the second surface and a fifth surface connecting the third surface and the fourth surface. The holding member covers at least a part of the fifth surface.

According to a preferred mode of the above first aspect, the holding member has a first surface directed in the same direction as the third surface of the protrusion and a second surface directed in the same direction as the fourth surface of the protrusion.

According to a preferred mode of the above first aspect, the first surface of the holding member forms the same plane as the third surface of the protrusion or exists on a side closer to the first surface of the workpiece body than the third surface of the protrusion.

According to a preferred mode of the above first aspect, the second surface of the holding member forms the same plane as the fourth surface of the protrusion or exists on a side closer to the second surface of the workpiece body than the fourth surface of the protrusion.

According to a preferred mode of the above first aspect, the holding member further covers at least a part of the third and fourth surfaces of the protrusion.

According to a preferred mode of the above first aspect, the protrusion has a thickness substantially same as that of the holding member.

According to a preferred mode of the above first aspect, the protrusion has a width of 0.3 mm to 2 mm in the protruding direction.

According to a preferred mode of the above first aspect, the protrusion is arranged at a central area in the thickness direction of the workpiece body.

According to a preferred mode of the above first aspect, a planar shape of the sections has a sector shape.

According to a preferred mode of the above first aspect, a plurality of the sections is combined to form the workpiece body having a circular planar shape.

According to a preferred mode of the above first aspect, a plurality of the sections has the same shape respectively.

According to a preferred mode of the above first aspect, one of the sections is a portion which is not processed by a processing apparatus.

According to a preferred mode of the above first aspect, the one section is smaller than the size which can be fixed on the processing apparatus.

According to a preferred mode of the above first aspect, the workpiece body is ceramic, metal or resin.

According to a preferred mode of the above first aspect, the workpiece body is a pre-sintered body in which zirconia crystal grains are not completely sintered.

According to a preferred mode of the above first aspect, the workpiece body has a worked item which is formed by processing the workpiece body and connected to the protrusion or the outer edge portion of the workpiece body.

According to a preferred mode of the above second aspect, in a step for expanding a holding member, the holding member is heated to 60° C. to 150° C.

According to a preferred mode of the above second aspect, the holding member comprises engineering plastic.

A workpiece unit (or assembly) according to a first exemplary embodiment of the present disclosure will be explained. FIG. 1 shows a schematic plan view showing a workpiece unit according to the first exemplary embodiment. FIG. 2 shows a schematic cross-sectional view of the workpiece unit along line IT-IT of FIG. 1.

A workpiece unit (or assembly) 10 has a workpiece body 1 and a holding member 2 arranged on at least a part of a side wall of the workpiece body 1. The workpiece body 1 is processed for example by a processing apparatus. For example in a field of the dentistry, dental products are produced from the workpiece body 1. As dental products, for example, prosthesis such as a ceramic frame, full contour crown etc. can be mentioned. It is preferable that the dental prosthesis has a tooth crown form. Further, the dental product may also comprise, for example, an orthodontic product (for example, an orthodontic bracket), and a dental implant product (for example, a dental implant abutment). The holding member 2 assists the workpiece unit 10 to be held or fixed on the processing apparatus. For example, when the workpiece unit is held or fixed on the processing apparatus, at least the holding member 2 of the workpiece unit 10 is held by the processing apparatus.

The workpiece body 1 has a first surface 1a dedicated as a processed surface (surface-to-be-worked) and a second surface 1b arranged on a side opposite to the first surface 1a. It is preferable that the first surface 1a and the second surface 1b are parallel or substantially parallel.

It is preferable that the workpiece body 1 has a plate shape. In the exemplary embodiment shown in FIG. 1, the workpiece unit 10 and the workpiece body 1 have a circular planar shape, but they are not limited to circular but also may have a planar shape such as an elliptical shape or a polygonal shape.

The workpiece body 1 is physically divided into a plurality of sections 11. One workpiece body 1 is configured by combination of a plurality of the sections 11. At least two sections 11 of a plurality of the sections 11 can differ in composition respectively. For example, each section 11 can contain different colorants from each other. At least two of the sections 11 of a plurality of the sections 11 may have the same composition or all of the sections 11 may have the same composition. The main material of each section 11 may be identical or different from one another. It is preferable that one section 11 is smaller than a size which can be held or fixed on the processing apparatus.

At least one of a plurality of the sections 11 can be a part which is processed by the processing apparatus. At least one of a plurality of the sections 11 can be a part which is not processed by the processing apparatus. At least one of a plurality of the sections 11 can be a dummy workpiece body that is adapted for compensating the size of the workpiece body 1 and for making the workpiece body 1 to the size which can be held on the processing apparatus.

It is preferable that the workpiece body 1 is divided by each section 11 so as to divide the first surface 1a and the second surface 1b of the workpiece body 1. The number of sections 11 for one workpiece body 1 can be selected appropriately. A size of one section 11 can be appropriately adjusted according to demand etc of each composition etc. A plurality of the sections 11 may have different sizes from each other or may have the same size.

A shape of each section 11 may be any shape. A plurality of the sections 11 may have different shapes from each other or may have the same shape. When the planar shape of the workpiece 1 is circular, it is preferable to divide the workpiece body 1 so that the section(s) 11 pass(es) through the central area of the circle. For example, each section 11 can have a fan (sector)-shaped planar shape. When the sections 11 have fan shapes, it is preferable that the radius of the fan shapes is the same. As a result, the workpiece body 1 having a circular shape or an elliptical shape can be formed by combining a plurality of the sections 11 in radial-wise such that each arc thereof is continuous. It is preferable that the sum of the central angles of a plurality of the sections 11 is 360°. The center angle of each fan-shape may be any angle, for example, 45°, 60°, 90°, 120°, 180° (i.e., semi-circular, semi-elliptical, etc.), 240°, 270°, 300°, 315° etc.

It is preferable that a plurality of the sections 11 has the same thickness. As a result, both the first surface 1a and the second surface 1b can be formed in a plane. Further, it is also easy to align the thickness direction when the workpiece unit 10 is fixed on the processing apparatus.

In the exemplary embodiment shown in FIG. 1 and FIG. 2, the workpiece body 1 has a first section 11a, a second section 11b and a third section 11c. The first section 11a, the second section 11b and the third section 11c have the same shape. The first section 11a, the second section 11b and the third section 11c have the same size. The first section 11a, the second section 11b and the third section 11c have a planar shape in which both surfaces thereof are fan-shaped. The central angle of the fan shape (sector) is 120°. The first section 11a, the second section 11b and the third section 11c are arranged in radial-wise to form the circular workpiece body 1. Both surfaces of the first section 11a, the second section 11b and the third section 11c are arranged on the same plane respectively, and the first surface 1a and the second surface 1b are formed in a plane.

FIG. 3 to FIG. 6 show a schematic plan view of a workpiece body showing an example of a plane shape of sections. FIG. 3 to FIG. 6 show states in which the sections forming one workpiece body are separated. In the exemplary embodiment shown in FIG. 3, the sections 11a, 11b and 11c have a fan-shaped plane shape with a central angle of 120°. In the mode shown in FIG. 4, the sections 11a and 11b have a semi-circular planar shape. In the mode shown in FIG. 5, the section 11a has a semi-circular planar shape, and the sections 11b and 11c have a fan-shaped planar shape with a central angle of 90°. In the modes shown in FIG. 3 to FIG. 5, the radius of each section is the same size. In the mode shown in FIG. 6, although the sections 11a to 11f do not have a fan-shaped planar shape, they are configured so as to form a circle together.

FIG. 7 shows a schematic plan view of a workpiece body showing another mode of a workpiece body. The sections 11 may be in direct contact with each other with respect to the adjacent sections 11. Alternatively, as shown in FIG. 7, the workpiece body 1 may further include a cushioning (buffer) material 6 in at least a part between adjacent sections 11. The cushioning material 6 is preferably a material that is able to absorb irregularities at the end faces of the section 11. The cushioning material 6 may be an adhesive for joining the sections 11 with each other. For the cushioning material 6, for example, a resin sheet can also be used. In the exemplary embodiment shown in FIG. 7, the cushioning material 6 is disposed entirely between the sections 142, but the cushioning material 6 may be partially disposed between the sections 11. By using the cushioning material 6, it is possible to suppress non-alignment of combination due to irregularities at the end faces of the sections 11. Further, by using the adhesive as the cushioning material 6, it is possible to increase the strength of junction between the sections 11.

FIG. 8 shows a schematic side view of a workpiece body showing another form of a workpiece body. The section 11 may have an engaging portion that engages with an adjacent section 11 at the end face facing to the adjacent section 11. As shown in FIG. 8, the engaging portion is formed, for example, at a concave portion 11g formed at the end face of the section 11a and on the end face of the section 11b, and can be configured as a convex portion 11h engaging with the concave portion 11g. In addition to the engaging portion, the workpiece body 1 may further have a cushioning material 6 as shown in FIG. 7. By providing the engaging portion, it is possible to increase the strength of junction between the sections 11.

A holding member 2 is disposed on at least a part of the outer circumferential portion 1c corresponding to the side face of the workpiece body 1. It is preferable that the holding member 2 surrounds the outer circumferential portion 1c of the workpiece body 1. It is preferable that the holding member 2 maintains the combination (assembly) of a plurality of the sections 11. It is preferable, for example, that a plurality of the sections 11 is maintained in the form of the workpiece body 1 by the contraction force of the holding member 2. The production cost can be reduced by using the holding member 2 in order to reduce the waste portion (remaining portion) of the workpiece body 1. In addition, the producing cost can be reduced by decreasing an amount of raw material used for the workpiece body 1, since a mold for manufacturing the workpiece body 2 can be down-sized by the width of the holding member 2.

It is preferable that the holding member 2 is continuously arranged along the outer circumferential portion 1c. The holding member 2 preferably has a shape corresponding (or adapted) to the planar shape of the workpiece body 1. The holding member 2 can have, for example, an annular, annular, and tubular or ring shape. The holding member 2 is preferably arranged over the entire circumference of the side wall of the workpiece body 1. A gap (or gaps) may exist between the holding member 2 and the workpiece body 1.

FIG. 9 and FIG. 10 show a schematic partial cross-sectional view of a workpiece unit according to the first exemplary embodiment. FIG. 9 and FIG. 10 are schematic partial cross-sectional views of the holding member 2 and the workpiece body 1. FIG. 9 shows a mode without an adhesive and FIG. 10 shows a mode with an adhesive 3. As shown in FIG. 9, the holding member 2 can cover at least a part of the outer circumferential portion 1c of the workpiece body 1 without using an adhesive. The inner circumferential portion 2c of the holding member 2 and the outer circumferential portion 1c of the workpiece body 1 are in direct contact with each other in at least a part thereof. Alternatively as shown in FIG. 10, the holding member 2 can cover at least a part of the outer circumferential portion 1c of the workpiece body 1 via the adhesive 3 that joins the workpiece body 1 and the holding member 2.

When the adhesive 3 is not used, it is possible to prevent the force due to thermal expansion of the holding member 2 from being transmitted to the workpiece 1 body via the adhesive. As a result, even if it is exposed to a high temperature after processing, it is possible to suppress occurrence of defects (for example, fracture of the workpiece body 1 or worked item) due to a difference in thermal expansion coefficient between the workpiece body 1 and the holding member 2. Further, when it is desired to remove the holding member 2 from the workpiece body 1 after processing, the holding member 2 can be easily removed from the workpiece body 1.

The holding member 2 may have a first surface 2a directed in the same direction as the first surface 1a of the workpiece body 1, a second surface 2b directed in the same direction as the second surface 1b of the workpiece body 1 and a inner circumferential portion 2c arranged between the first surface 2a and the second surface 2b and directed in the direction of the outer circumstantial portion 1c of the workpiece body 1. It is preferable that the first surface 2a of the holding member 2 and the first surface 1a of the workpiece body 1 are parallel or substantially parallel. It is preferable that the second surface 2b of the holding member 2 and the second surface 1b of the workpiece body 1 are parallel or substantially parallel. The first surface 2a of the holding member 2 can exist on a side closer to the second surface 1b of the workpiece body 1 than the first surface 1a of the workpiece 1. Similarly, the second surface 2b of the holding member 2 can exist on a side closer to the first surface 1a of the workpiece body 1 than the second surface 1b of the workpiece 1. That is, it is preferable that a step is formed between the first surface 1a of the workpiece body 1 and the first surface 2a of the holding member 2. It is preferable that a step is formed between the second surface 1b of the workpiece body 1 and the second surface 2b of the holding member 2. It is preferable that the holding member has a thickness t2 thinner than an entire thickness t1 of the workpiece body 1. Hereby the positioning is facilitated when the workpiece unit 10 is fixed on the processing apparatus.

It is preferable that the holding member 2 is disposed at a central area of the workpiece body 1 in the thickness direction of the workpiece body 1. That is, it is preferable that the center of the holding member 2 in the thickness direction overlaps with the center of the workpiece body 1 in the thickness direction. Hereby the positioning is facilitated when the workpiece unit 10 is set on the processing apparatus.

It is preferable that the workpiece unit 10 is symmetrical with respect to the extending direction of the first surface 1a and the second surface 1b of the workpiece body 1. For example, it is preferable that both of the first surface 1a and the second surface 1b of the workpiece body 1 can be set on the processing apparatus such that they are directed toward a processing tool (usually the upper side).

A thickness t3 of the holding member 2 may be any thickness as long as the thickness does not hinder the processing of the workpiece body 1. It is preferable that a thickness t2 of the holding member 2 is thinner than a thickness t1 of the workpiece body 1. This makes it easier to hold the workpiece unit 10 on the processing apparatus. The thickness t2 of the holding member 2 is preferably 1 mm or more, more preferably 2 mm or more, and even more preferably 4 mm or more. This is for keeping the strength for holding by the processing apparatus.

A width w1 of the holding member 2 may be any width as long as it allows the workpiece unit 10 to be held on the processing apparatus.

As a material of the workpiece body 1 or the sections 11 for example, ceramic, metal, resin or the like can be used. As an example of the ceramic, a material containing at least one of zirconia, alumina and crystallized glass can be mentioned. As an example of metal, titanium and titanium alloys etc. can be mentioned. As an example of resin, acrylic resin, methacrylic resin, ABS (acrylonitrile butadiene styrene) resin, polycarbonate, polypropylene, polystyrene, polyester, polyether ketone, Teflon (registered trademark) and the like can be mentioned. Further, a composite material (composite resin) in which inorganic filler is filled in these resins can also be mentioned as an example of resin.

In the case that a section 11 is a section which is not processed (dummy workpiece body), as the material for the section 11 not processed, in addition to the above mentioned materials, any material can be used as long as it allows the workpiece unit 10 to be held on the processing apparatus and has strength which makes it possible to process the section 11 to be processed.

When the workpiece body 1 is used, for example, for cutting out a dental product, the workpiece 1 can be a zirconia pre-sintered body which is sintered in a state in which the zirconia crystal grains are not completely sintered. The zirconia pre-sintered body contains zirconia and a stabilizer that suppresses phase transition of the zirconia crystal phase. For example, the stabilizer suppresses the phase transition of the crystal phase of the sintered body from tetragonal to monoclinic phase when it becomes a sintered body. As the stabilizer, for example, oxides such as calcium oxide (CaO), magnesium oxide (MgO), yttrium oxide ($Y_2O_3$) and cerium oxide ($CeO_2$) etc. can be mentioned. The stabilizer is preferably added in such an amount that the tetragonal zirconia grains can be partially stabilized. For example, when yttria is used as the stabilizer, the content of yttria is preferably 2 mol % to 8 mol %, more preferably 2.5 mol % to 6.5 mol %, with respect to the total mol number of zirconia and yttria. If the content of the stabilizer is excessively increased, though the phase transition can be suppressed, the bending strength and the fracture toughness are lowered. On the other hand, if the content of the stabilizer is too low, though the lowering of the flexural strength and the fracture toughness can be suppressed, progress of the phase transition will be insufficiently suppressed. It should be noted that zirconia partially stabilized by addition of a stabilizer is called "a partially stabilized zirconia". The content of the stabilizer in the zirconia sintered body can be measured by for example, inductively coupled plasma (ICP) emission spectroscopic analysis, fluorescent X-ray analysis etc.

The size dl of the whole of the workpiece body 1 and the thickness t1 of the workpiece body 1 can be selected appropriately in accordance with purpose.

It is preferable that the material of the holding member 2 is such a material which is not greatly deformed by the pressure occurring when it is fixed on the processing apparatus. Further, it is preferable that the material of the holding member 2 is such a material that can be attached to the workpiece body 1 by a method described below. As a material of the holding member 2, for example, engineering plastic, polypropylene, polystyrene, acrylic resin, ABS (acrylonitrile butadiene styrene) resin, polycarbonate, polyester, polyether ketone, Teflon (registered trademark), metal and wood etc. can be used. Further, the above examples of resins can also include a composite material (composite resin) in which inorganic filler is filled in these resins.

Information can be added to the holding member 2. For example, information with a symbol such as a letter or a barcode can be provided by printing, stamping, sealing, etc. at a position where the holding member 2 can be visually recognized. The information includes, for example, lot number, color tone (shade), contraction ratio (shrinkage ratio upon sintering), upper and lower discrimination etc.

A method for producing the workpiece unit according to the first exemplary embodiment will be explained.

First, each section 11 is produced. Partially stabilized zirconia powder is prepared, which is zirconia particles containing a stabilizer. A type and concentration of the stabilizer can be selected appropriately. A particle size and particle size distribution of the zirconia crystal grains are selected appropriately. As a method for adding the stabilizer to the zirconia particles, a suitable method such as hydrolysis process, neutralization coprecipitation process, alkoxide process, solid phase process etc. can be selected appropriately. If necessary, an additive is added and mixed to the prepared partially stabilized zirconia powder. When wet mixing is used, the composition is dried.

Next, the composition is pressure-molded into a predetermined shape. For example, the composition is pressure-molded into the shape of the section 11. As the pressure-molding method, a suitable method can be selected appropriately. The applied pressure may be, for example 20 MPa or more. After the pressure-molding, the composition for sintering may be further subjected to CIP (Cold Isostatic Pressing), for example, at a pressure of 150 MPa or more. After the pressure-molding, the molded body may be processed into a desired shape by cutting, grinding etc.

Next, the molded body is fired at a temperature at which the zirconia grains are not sintered, to form a pre-sintered body. A condition of pre-sintering may be, for example 800° C. to 1200° C. as a pre-sintering temperature and a keeping time thereof may be 1 hour to 12 hours. The pre-sintered body may be processed into a desired shape by cutting, grinding etc. For example, the pre-sintered body may not be formed into the shape of the section 11 at the time of molding, but be formed into the shape of the section 11 after preparing the pre-sintered body.

In the above steps, a plurality of the sections 11 constituting the workpiece body 1 is produced. Then, the workpiece 1 as described above is produced by combining a plurality of the sections 11. As necessary, the cushioning (buffer) material 6 is incorporated between the sections 11. The combining step of the sections 11 may be performed at the time of attaching the holding member 2 described later.

Next, the holding member 2 is prepared. A method of manufacturing the holding member 2 is not particularly restricted. For example, the holding member 2 can be manufactured by using injection molding, extrusion molding, cutting processing (forming by cutting) etc. In the case of the ring-shaped holding member 2, for example, the holding member 2 is expanded by heating. A heating temperature of the holding member 2 can be appropriately selected according to the material of the holding member 2. For example, when the holding member 2 is engineering plastic, the heating temperature of the holding member 2 is preferably 60° C. or greater, more preferably 80° C. or greater. Further, the heating temperature of the holding member 2 is preferably 150° C. or less, for example may be 120° C. or less or 100° C. or less. Next, the workpiece body 1 is inserted into the holding member 2 in a state that the holding member 2 is expanded. Next, the holding member 2 and the workpiece body 1 are aligned with each other, and then the holding member 2 is cooled. The holding member 2 contracts by cooling. As a result, the holding member 2 is mounted on the workpiece body 1 (so-called shrink fitting method). According to this method, the holding member 2 can be mounted to the workpiece body 1 without using an adhesive.

FIG. 11 and FIG. 12 show in a schematic cross-sectional view of the workpiece unit an example of the workpiece unit after the workpiece body is processed. FIG. 11 shows a state in which the first section 11a is processed but the second section 11b is not processed. FIG. 12 is a schematic partial cross-sectional view of the holding member portion. The processing apparatus can be set so as to process a specific part (for example, the specific section 11) of the workpiece body 1. For example, it is possible to set so as to process only the position of the first section 11a. The workpiece unit 10 A is attached to the processing apparatus, then the worked item 4 is formed by processing such as cutting the workpiece body 1. The worked item 4 can be cut out in such a state that the outer edge portion 1e of the workpiece body 1 remains in a frame shape and the worked item is connected to the outer edge portion 1e. The worked item 4 is for example a dental product as described above. By forming the worked item 4, a cut portion 5 which was cut is formed in the workpiece body 1. The outer edge portion 1e is formed along the outer circumferential portion 1c by forming the worked item 4 and the cut portion 5. The outer edge portion 1e is a processing margin and acts as a frame of the worked item 4. The worked item 4 is connected to the outer edge portion 1e by a connecting portion 4a. It is preferable that the shape of the first positioning portion which will be described bellow will be formed in such a shape that does not cause adverse effects such as falling out of the worked item 4 after processing.

According to the first exemplary embodiment, the workpiece body can comprise a plurality of the sections having different compositions. A size and shape of each section can be adjusted according to demand. Hereby, it is possible to increase utilization efficiency of the workpiece body and reduce the waste portion of the workpiece body. It is also possible to produce and sell the workpiece body for each section. Further, it is possible to produce the worked item having different compositions by the processing apparatus in one processing step.

A workpiece unit according to a second exemplary embodiment of the present disclosure will be explained. FIG. 13 shows a schematic plan view of the workpiece unit according to the second exemplary embodiment. FIG. 14 shows a schematic plan view of the section unit according to the second exemplary embodiment. In the first exemplary embodiment, one holding member is applied to the section or sections. In the second exemplary embodiment, a part of the holding member is disposed for each section.

The workpiece unit 150 according to the second exemplary embodiment includes a plurality of section units 21. Each section unit 21 has a section 11 and a covering member 12 disposed on at least a part of a side face of the section 11. The section 11 may be the same as the section of the first exemplary embodiment. A size of one section unit can be smaller than a size that can be held on the processing apparatus.

In the mode shown in FIG. 14, the covering member 12 surrounds an outer circumferential portion (side face) of the section 11. The covering member 152 can be the same as the holding member in the first exemplary embodiment except that it surrounds one section. The covering member 12 forms the holding member that is held by the processing apparatus, when the workpiece unit 20 is formed by combining a plurality of the section units 21. A part of one covering member 12 constitutes a part of the holding member. By combining a plurality of the section units 21, the holding member is formed such that a part of the covering member 12 continuously surrounds the combination of the sections 11. For example, when the section 11 has a fan shape (sector), a portion of the covering members 12 which is arranged on the circular arc section of the section 11 constitutes the holding member. A portion of the covering member 12 not constituting the holding member can act as a buffering portion which facilitates joining with the adjacent section smoothly.

The section units 21 can be joined with each other by an adhesive (not shown). Alternatively, an engaging portion may be provided for engaging the covering members 12 with each other in a portion where the covering members 12 face each other.

FIG. 15 shows a schematic plan view of a section unit having a different form from that shown in FIG. 14. In the mode shown in FIG. 14, the covering member is arranged over the entire circumference of the section. In the section unit 22 according to the mode shown in FIG. 15, the covering member 13 is disposed merely on a part of the side face of the section 11. By combining the section units 22 in the same manner as the combination shown in FIG. 13, it is possible to constitute the workpiece unit as shown in FIG. 1. The covering member 13 is disposed on a portion that functions as a holding member when the selection units are combined. In the mode in FIG. 15, the covering member 13 is arranged along the circular arc portion of the section 11. The covering member 13 is not provided on a portion of the side surface of the section 11 which faces the adjacent section 11 when the partitioning units 22 are combined. The section unit 22 shown in FIG. 15 is the same as that of the section unit shown in FIG. 14 except that the placement position of the covering member 13 is different.

The section units 22 can be joined with each other by an adhesive (not shown). Alternatively, an engaging portion may be provided for engaging the sections 11 with each other in a portion where the sections 11 face each other.

Other modes in the second exemplary embodiment than those described above can be the same as those in the first exemplary embodiment. The second exemplary embodiment can be combined with at least one of the exemplary embodiments described above as far as possible.

According to the second exemplary embodiment, the same effects as those of the first exemplary embodiment can be obtained. Since it can be produced or sold for each section unit, the user can arbitrarily set the combination of compositions in the workpiece unit by producing or purchasing the section unit according to the demand.

A workpiece unit (assembly) according to a third exemplary embodiment of the present disclosure will be explained. FIG. 16 shows a schematic plan view of the workpiece unit according to the third exemplary embodiment. FIG. 17 shows a schematic plan view of a dummy workpiece body according to the third exemplary embodiment. In the second exemplary embodiment, the workpiece unit is constituted of a plurality of the section units which are combined. In the third exemplary embodiment, the workpiece unit 30 is constituted by using one section unit.

The workpiece unit 30 has a section unit 21 and a dummy workpiece body 31. The section unit 21 is the same as the section unit 21 according to the second exemplary embodiment. The dummy workpiece body 31 makes it possible to hold the section unit 21 on the processing apparatus by compensating the size of the section unit 21. The dummy workpiece body 31 can have a holding portion 31a for holding itself on the processing apparatus. The holding portion 31a has the same function as the holding member. The holding portion 31a may be formed integrally as a part of the dummy workpiece body 31 or may be formed as a separate member. In the exemplary embodiment shown in FIG. 16 and FIG. 17, the dummy workpiece body 31 has such a planar shape that three section units 21 are combined. In the exemplary embodiment shown in FIG. 16 and FIG. 17, the dummy workpiece body 31 has such a planar shape as to form a circular shape by combining with the section unit 21.

A shape and size of the dummy workpiece body 31 can be designed according to the shape and size of the section unit 21. The dummy workpiece body 31 has a thickness that can be held on the processing apparatus. Material of the dummy workpiece body 31 may be any material as long as it can be held on the processing apparatus and the section can be processed. As a material of the dummy workpiece body 31, for example, the same material as the holding member can be used.

The dummy workpiece body 31 and the section unit 21 can be joined to each other by an adhesive (not shown). Alternatively, an engaging portion may be provided for engaging the dummy workpiece body 31 and the section unit 21 in a portion(s) where the dummy workpiece body 31 and the section unit 21 face each other.

It is preferable that the dummy workpiece body 31 can be used repeatedly. It is preferable that the section unit 21 is attachable and detachable to and from the dummy workpiece body 31.

FIG. 18 shows another mode from the mode shown in FIG. 16. The workpiece unit 33 has a section (workpiece body) 23, a dummy workpiece body 34 for holding the section 23, and an adhesive 24 for joining the section 23 and the dummy workpiece body 34. The dummy workpiece body 34 has an annular or tubular structure with an opening bored in the size of the section 23. The dummy workpiece body 34 can have a holding portion 34a for holding on the processing apparatus. In the mode shown in FIG. 18, the section 23 is fitted concentrically in the opening of the dummy workpiece body 34 and joined by the adhesive 24. A size (for example, radius) of the section 23 can be 80% or less, 60% or less, 50% or less, or 40% or less of the size (for example, radius) that can be held on the processing apparatus.

It is preferable that the dummy workpiece body 34 has such a strength that the dummy workpiece body is not deformed during processing by the processing apparatus.

Other modes in the third exemplary embodiment than those described above can be the same as those in the first and the second exemplary embodiments. The third exemplary embodiment can be combined with at least one of the exemplary embodiments described above as far as possible.

According to the third exemplary embodiment, the same effects as those of the first exemplary embodiment can be obtained. It is not necessary to enlarge the workpiece body to a size in which the workpiece body can be held on the processing apparatus. Hereby, even when the workpiece body has a composition with low demand, it can be processed without requiring a workpiece body of another composition.

A workpiece unit according to a fourth exemplary embodiment of the present disclosure will be explained. FIG. 19 shows a schematic plan view of a workpiece unit according to the fourth exemplary embodiment. FIG. 20 shows a schematic cross-sectional view of the workpiece unit along line XX-XX in FIG. 19. FIG. 21 shows a schematic partial cross-sectional view of a holding member portion.

In the workpiece unit 40 according to the fourth exemplary embodiment, in addition to the configuration of the first exemplary embodiment, the workpiece body 41 further has a protrusion 41c. The holding member 2 is disposed on at least a part of the protrusion 41c.

The workpiece body 41 has a first surface 41a dedicated as processing surface (surface-to-be-worked) and a second surface 41b arranged on a side opposite to the first surface 1a. It is preferable that the first surface 41a and the second surface 41b are parallel or substantially parallel. It is preferable that the workpiece body 41 has a plate shape. In the exemplary embodiment shown in FIG. 19, the workpiece unit 40 and the workpiece body 41 have a circular planar shape, but it is not limited to have a circular one and they also may have a planar shape such as an elliptical shape or a polygonal shape.

The workpiece 41 has the protrusion 41c for holding the workpiece unit 40 on the processing apparatus along at least a part of the side wall, that is, on the outer edge of the first surface 41a and the second surface 41b or on the outer circumstantial portion 41g provided between the first surface 41a and the second face 41b. It is preferable that the protrusion 41c is continuously arranged over the entire circumference of the outer circumstantial portion 41g of the workpiece body 41. That is, it is preferable that the protrusion 41c has a ring shape or an annular shape. The protrusion 41c may have a form protruding from the side face of the workpiece body 41. For example, the protrusion 41c can protrude in a direction substantially perpendicular [sic. parallel] to the first surface 41a and the second surface 41b between the first surface 41a and the second surface 41b of the workpiece body 41. Further, the protrusion 41c is located on the outer circumferential portion 41g of the workpiece body 41, and can have such a form in which the end portion of the workpiece body 41 is thinner than the other portions.

At least one section can have at least a part of the protrusion 41c of the workpiece body 41. It is possible to make the protrusion 41c continuously by combining a plurality of the sections 42a to 42d.

The protrusion 41c may have a third surface 41d directed in the same direction as the first surface 41a and a fourth surface 41e directed in the same direction as the second surface 41b. The protrusion 41c may have a fifth surface 41f connecting the third surface 41d and the fourth surface 41e. It is preferable that the third surface 41d and the fourth surface 41e are parallel or substantially parallel. It is preferable that the third surface 41d and the first surface 41a are parallel or substantially parallel. It is preferable that the fourth surface 41e and the second surface 41b are parallel or substantially parallel. It is preferable that the third surface 41d and the fifth surface 41f are perpendicular or substantially perpendicular. It is preferable that the fourth surface 41e and the fifth surface 41f are perpendicular or substantially perpendicular. It is preferable that the first surface 41a and the second surface 41b are perpendicular or substantially perpendicular to the fifth surface 41f. It is preferable that the thickness t12 of the protrusion 41c is thinner than the entire thickness t11 of the workpiece body 41. That is, it is preferable that a step is formed between the first surface 41a and the third surface 41d. It is preferable that a step is formed between the second surface 41b and the fourth surface 41e. Hereby the positioning is facilitated, when the workpiece unit 40 is fixed on the processing apparatus. It should be noted that the first surface 41a and the third surface 41d may form the same plane. Further, the second surface 41b and the fourth surface 41e may form the same plane.

The thickness t12 of the protrusion 41c is preferably 1 mm or more, more preferably 2 mm or more, and still more preferably 4 mm or more. This is for holding the workpiece unit 40 during processing and for reinforcing the workpiece body 41 after processing.

The width w11 of the protrusion 41c is preferably 2 mm or less, more preferably 1.7 mm or less, and still more preferably 1.5 mm or less. An amount of the waste of the material of the workpiece 41 increases, if the width w11 of the protrusion 41c is too large. The width w11 of the protrusion 41c is preferably 0.3 mm or more, more preferably 0.4 mm or more, more preferably 0.6 mm or more, and further preferably 0.8 mm or more. The protrusion 41c has a function of reinforcing the workpiece body 41 after processing. Therefore, in order to reinforce the workpiece body 41 after processing, a certain width is required for the protrusion 41c.

It is preferable that the protrusion 41c is arranged at a central area of the workpiece body 41 in the thickness direction of the workpiece body 41. That is, it is preferable that the center in the thickness direction of the protrusion 41c overlaps with the center in the thickness direction of the workpiece body 41. Hereby the positioning is facilitated, when the workpiece unit 40 is set on the processing apparatus.

The size d12 of the whole of the workpiece body 41 and the size d13 of the first surface 41a and the second surface 41b dedicated as a surface-to-be-processed (termed "processing surface") of the workpiece body 41 can be determined appropriately The holding member 2 is disposed on at least a part of the outer side of the protrusion 41c. It is preferable that the holding member 2 is arranged at least in the protruding direction of the protrusion 41c. It is preferable that the holding member 2 is continuously arranged along the fifth surface 41f corresponding to the side face of the protrusion 41c. That is, the holding member 2 covers at least a part of the fifth surface 41f of the protrusion 41c. The fifth surface 41f of the protrusion 41c and the inner circumferential portion 2c of the holding member 2 face each other. At least a part of the fifth surface 41f of the protrusion 41c and the inner circumferential portion 2c of the holding member 2 can directly contact each other. It is preferable that the first surface 2a of the holding member 2 and the third surface 41d of the workpiece body 41 are parallel or substantially parallel. It is preferable that the first surface 2b of the holding member 2 and the fourth surface 41e of the workpiece body 41 are parallel or substantially parallel.

The third surface 41d of the protrusion 41c and the first surface 2a of the holding member 2 can form the same plane. Similarly, the fourth surface 41e of the protrusion 41c and the second surface 2b of the holding member 2 can form the same plane. This is to ensure that the holding member 2 and the protrusion 41c completely overlap each other. In this case, the thickness t13 of the holding member 2 is the same as the thickness t12 of the protrusion 41c. Alternatively, the first surface 2a of the holding member 2 can exist on a side closer to the first surface 11a of the workpiece body 41 than the third surface 41d of the protrusion 41c. Similarly, the second surface 2b of the holding member 2 can exist on a side closer to the second surface 41b of the workpiece body 41 than the fourth surface 41e of the protrusion 41c. This is for making it easier to hold the workpiece unit 40 on the processing apparatus. In this case, the thickness t13 of the holding member 2 is thicker than the thickness t12 of the protrusion 41c.

The thickness t13 of the holding member 2 may be any thickness as long as it does not hinder the processing of the workpiece body 41. The thickness t13 of the holding member 2 is preferably thinner than the thickness t1 of the workpiece body 41 and more preferably equal to the thickness t12 of the protrusion 41c. This is for making it easier to hold the workpiece unit on the processing apparatus. The thickness t13 of the holding member 2 is preferably 1 mm or more, more preferably 2 mm or more, and still more preferably 4 mm or more. This is for maintaining the strength of holding by the processing apparatus.

It is preferable to hold the protrusion 41c and the holding member 2 on the processing apparatus with their engaged portion. Therefore, it is preferable that the width w12 of the holding member 2 has a width that can be held on the processing apparatus together with the width w11 of the protrusion 41c.

A method for producing the workpiece unit 40 can be the same as the method for producing according to the first exemplary embodiment.

The forms of the protrusion and the holding member may take a form different from the exemplary embodiments shown in FIGS. 19 to 21. FIGS. 22 to 25 show other examples of the protrusion and the holding member.

In the workpiece unit 50 shown in FIG. 22, the holding member 52 is arranged so as to cover not only the fifth surface 41f of the protrusion 41c but also at least a part of the third surface 41d and the fourth surface 41e. That is, the holding member 52 may have a groove portion for accommodating the protrusion 41c on the side of the workpiece body 41. The holding member 52 can be arranged so that the protrusion 41c is fitted into the groove portion.

The width w14 of the protrusion 41c is preferably the same as the width w11 shown in FIG. 20. The width (w14+w15) of the holding member 52 is preferably the same as the width (w11+w12) shown in FIG. 20. The thickness t14 of the protrusion 41c is preferably 1 mm or more in order to ensure the strength. The thickness t15 of the holding member 52 is preferably equal to or less than the thickness of the workpiece body 41 in order to hold it on the processing apparatus.

In the workpiece unit 60 shown in FIG. 23, the holding member 62 can be arranged so as to cover the fifth surface 41f and either the third surface 41d or the fourth surface 41e of the protrusion 41c. In the exemplary embodiment shown in FIG. 23, the holding member 62 is arranged so as to cover the third surface 41d and the fifth surface 41f of the protrusion 41c.

The holding member 62 has a first surface 62a directed in the same direction as the second surface 41b and the fourth surface 41e of the workpiece body 41. It is preferable that the holding member 62 is arranged so that the first surface 62a forms the same plane as the fourth surface 41e of the protrusion 41c or exists on a side closer to the second surface 41b than the fourth surface 41e of the protrusion 41c. This is for stabilizing the attachment of the workpiece unit 60 on the processing apparatus. It is preferable that the holding member 62 is arranged at a central area in the thickness direction of the workpiece body 41. In this case, the position of the protrusion 41c can be displaced from the center in the thickness direction of the workpiece body 41.

The width w16 of the protrusion 41c is preferably the same as the width w11 shown in FIG. 20. The width (w16+w17) of the holding member 62 is preferably the same as the width (w11+w12) shown in FIG. 20. The thickness t16 of the protrusion 41c is preferably 1 mm or more in order to ensure the strength. The thickness t17 of the holding member 62 is preferably equal to or less than the thickness of the workpiece body 41 in order to hold it on the processing apparatus.

In the workpiece unit 70 shown in FIGS. 24 and 25, the holding member 72 is composed of two or more parts. FIG. 25 is a plan view of the holding member 72 seen from the side surface. In the exemplary embodiment shown FIGS. 25 and 26, the holding member 72 has a first portion 72a covering the third surface 41d of the protrusion 41c and a second portion 72b covering the fourth surface 41e of the protrusion 41c. The fifth surface 41f of the protrusion 41c is covered with the first portion 72a and the second portion 72b. The first portion 72a and the second portion 72b have at least one engaging portion respectively on a side facing the fifth surface 41f of the protrusion 41c. For example, the first portion 72a and the second portion 72b are arranged so that the concave and convex portions are fitted on a side of the fifth surface 41f of the protrusion 41c. In the exemplary embodiment shown in FIG. 22, the boundary line between the first portion 72a and the second portion 72b is extending in a meander-shape.

In the first portion 72a and the second portion 72b, it is preferable that the regions where the concave and the convex portions are formed have the same shape. It is more preferable that the first portion 72a and the second portion 72b have the same shape as a whole. It is more preferable that the first portion 72a and the second part 72b are the same parts. In this case, the producing and management of the holding member 72 can be simplified.

According to the exemplary embodiment shown in FIGS. 25 and 26, it is possible to prevent positional displacement of each part by providing engaging portions on each part of the holding member 72. When the holding member 72 is composed of a plurality of parts, it is possible to facilitate attachment of the holding member 72 to the workpiece body 41.

In the exemplary embodiment shown in FIG. 24 the protrusion is provided, however the holding member can be composed of two or more parts also in a mode in which no protrusion exists.

In FIG. 26 a further mode (variant) according to the fourth exemplary embodiment is shown. The workpiece body 41 and the holding member 2 can also be joined by an adhesive 43 at least partly. The adhesive 43 is preferably arranged within a range of the thickness of the protrusion 1c and the holding member 2. It is preferable that a material of the adhesive 43 is a material that does not cause positional displacement between the workpiece body 41 and the holding member 2. As the adhesive 43, for example, a thermosetting resin, a photocurable resin, or the like can be used. The adhesive 43 can be applied, for example, when the holding member cannot be attached by the shrink fit method.

Other modes in the fourth exemplary embodiment than those above can be the same as in the first to third exemplary embodiments. The fourth exemplary embodiment can be combined with at least one of the exemplary embodiments described above as far as possible.

According to the fourth exemplary embodiment, the same effects as those of the first exemplary embodiment can be obtained.

The form of the workpiece body 41 after processing is the same as that shown in FIGS. 11 and 12, but the workpiece body 41 after processing further has the protrusion 41c on the outer edge portion 1e (FIGS. 11 and 12). The worked item 4 is connected to at least one of the outer edge portion 1e and the protrusion 41c. After processing as shown in FIGS. 11 and 12, even if the width of the outer edge portion of the workpiece body 41 becomes thinner and no sufficient strength can be obtained only by the outer edge portion, in the workpiece unit according to the second exemplary embodiment, it is possible to reinforce the outer edge portion of the workpiece 41 by the protrusion 41c. That is, the thickness of the outer edge portion of the workpiece body 41 can be partially secured by the protrusion 41c. Hereby, even when an impact is applied to the workpiece body 41 after processing, fracture of the workpiece body 41 can be suppressed. In addition, it is possible to increase the allowable range of positional displacement (tolerance) in attaching the workpiece unit 40 to the processing apparatus by providing the protrusion 41c.

A workpiece unit according to a fifth exemplary embodiment of the present disclosure will be explained. FIG. 27 shows a schematic partial cross-sectional view of a workpiece unit according to the fifth exemplary embodiment. FIG. 28 shows a schematic exploded cross-sectional view of a workpiece body and a holding member.

In the workpiece unit 80 according to the fifth exemplary embodiment, the workpiece body 81 has at least one first positioning portion 81d in a portion of an outer circumferential portion 81c which faces a holding member 82. The holding member 82 has at least one second positioning portion 82d in a portion of an inner circumferential portion 82c which faces the workpiece body 81. The first positioning portion 81d and the second positioning portion 82d are portions for determining the position of the holding member 82 relative to the workpiece body 81. The first positioning portion 81d and the second positioning portion 82d can also prevent the holding member 82 from being misaligned relative to the workpiece 81.

At least one section can have at least a part of the first positioning portion 81d of the workpiece body 81. It is possible to make the first positioning portion 81d continuously by combining a plurality of the sections.

The first positioning portion 81d and the second positioning portion 82d can be arranged at positions where they correspond to each other. The first positioning portion 81d and the second positioning portion 82d may have shapes corresponding to each other. For example, it is preferable that the first positioning portion 81d and the second positioning portion 82d have such positions and such shapes that at least a part of one is engaged with the other. In the exemplary embodiment shown in FIGS. 27 and 28, the first positioning portion 81d is formed as a concave portion. The second positioning portion 82d is formed as a convex portion that fits into the concave portion of the first positioning portion 81d. The positions of the first positioning portion 81d and the second positioning portion 82d may be an any positions as long as the outer circumferential portion 81c of the workpiece body 81 and the inner circumferential portion 82c of the holding member 92 face each other.

It is preferable that at least a part of the tip of the convex portion can be inserted into the concave portion. It is preferable that the convex portion has a shape and a size which comes into contact with the opening and/or the inner wall of the concave portion when it is inserted into the concave portion. For example, it is preferable that the width of the convex portion (for example, the size in the direction that connects the first surface 81a and the second surface 81b of the workpiece body 81 (vertical direction in the frame)) is larger than the width of the concave portion (the size in the vertical direction in the frame). In this way, it is possible to suppress a positional displacement of the holding member 82 relative to the workpiece body by fitting or engaging the first positioning portion 81d and the second positioning portion 82d.

FIGS. 29 to 32 show schematic plan views of examples of the first positioning portion 81d and the second positioning portion 82d. Although FIGS. 29 to 32 show the first positioning portion 81d in plan views, but the second positioning portion 82d also has a planar shape corresponding to the shape of the first positioning portion 81d. The illustration and explanation of the second positioning portion 82d are omitted. For example, as shown in FIGS. 29 and 30, the first positioning portion 81d can be formed as a continuous groove. The first positioning portion 81d may be a linear groove as shown in FIG. 29, or it also may be a groove of zigzag or meander-shape as shown in FIG. 30. For example, as shown in FIGS. 31 and 32, the first positioning portion 81d may be formed as at least one partial or discontinuous point-like concave portion (for example, a conical or columnar shape) or a fragmental groove. A dotted line formed by the first positioning portion 81d may be linear as shown in FIG. 31, or it may be zigzag or meander-shape as shown in FIG. 32. Although FIGS. 29 to 32 show the first positioning portion 81d having a regular shape, the first positioning portion 81d may have an irregular shape.

Although in the exemplary embodiment shown in FIGS. 27 and 28, the first positioning portion 81d and the second positioning portion 82d have one triangular cross section, but the first positioning portion 81d and the second positioning portion 82d can have other cross-sectional shapes. FIGS. 33 to 36 show schematic partial cross-sectional views of examples of the first positioning portion 81d and the second positioning portion 82d. For example, as shown in FIG. 33, the first positioning portion 81d and the second positioning portion 82d may have a polygonal cross section such as a rectangle etc. As shown in FIG. 34, the first positioning portion 81d may have a cross-sectional shape (hemispherical shape) such as a semi-circular, semi-elliptical etc. On the other hand, the second positioning portion 82d may have a sectional shape (hemispherical shape) such as a semi-circular, semi-elliptical similar to that of the first positioning portion 81d, or as shown in FIG. 34 may have a different shape(s) (Triangular shape in FIG. 34) from the first positioning portion 81d. As shown in FIG. 35, a part of the second positioning portion 82d may be engaged with the first positioning portion 81d. In the exemplary embodiment shown in FIG. 35, the width w22 of the second positioning portion 82d is equal to or larger than the width w21 of the first positioning portion 81d. A part of the second positioning portion 82d is inserted into the first positioning portion 81d, and the first positioning portion 81d and the second positioning portion 82d contact with each other partially at the upper and lower ends of the first positioning portion 81d. In this case, the outer circumferential portion 81c of the workpiece body 81 and the inner circumferential portion 82c of the holding member 82 may not contact with each other. Alternatively, as shown in FIG. 35, the holding member 82 may be deformed by its shrinkage, for example, and partially contact the outer circumferential portion 81c of the workpiece body 81 at the upper and lower ends of the inner circumferential portion 82c. Further, as shown in FIG. 36, in one cross section, the first positioning portion 81d and the second positioning portion 82d can have a plurality of concave or convex portions.

It is preferable that the first positioning portion 81d and/or the second positioning portion 82d has such a depth and/or a height which is equal to a depth and/or a height in which the first positioning portion 81d and the second positioning portion 82d can engage with each other. The depth and/or the height of the first positioning portion 81d and/or the second positioning portion 82d may be, for example, 0.5 mm or more.

A method for producing the workpiece unit 80 can be the same as the method for producing according to the first exemplary embodiment.

Other modes in the fifth exemplary embodiment than those described above can be the same as in the first to fourth exemplary embodiments. The fifth exemplary embodiment can be combined with at least one of the exemplary embodiments described above as far as possible.

According to the fifth exemplary embodiment, the same effects as those of the first exemplary embodiment can be obtained.

According to the fifth exemplary embodiment, the holding member 82 can be attached to the workpiece body 81 at an appropriate position by fitting the first positioning portion 81d and the second positioning portion 82d. Further, even after the holding member 82 is attached to the workpiece body 81, the first positioning portion 81d and the second positioning portions 82d play a role of slip prevention, and the positional displacement of the holding member 82 relative to the workpiece body 81 can be suppressed.

A workpiece unit according to a sixth exemplary embodiment of the present disclosure will be explained. FIG. 37 shows a schematic partial cross-sectional view of a workpiece unit according to the sixth exemplary embodiment.

In the fifth exemplary embodiment, the first positioning portion of the workpiece body is the concave portion, and the second positioning portion of the holding member is the convex portion. In a workpiece unit 90 according to the sixth exemplary embodiment, the concave and convex portions are reversed between the workpiece body 91 and the holding member 92. That is, the first positioning portion 91f arranged on an outer circumferential portion 91c of the workpiece body 91 is the convex portion. The second positioning portion 92f arranged on an inner circumferential portion 92c of the holding member 92 is the concave portion corresponding to the first positioning portion 91f.

A method for producing the workpiece unit 90 can be the same as the method for producing according to the first exemplary embodiment.

Other modes in the sixth exemplary embodiment than those described above can be the same as in the first to fourth exemplary embodiments. The sixth exemplary embodiment can be combined with at least one of the exemplary embodiments described above as far as possible.

According to the sixth exemplary embodiment, the same effects as those of the first and fifth exemplary embodiments can be obtained.

A workpiece unit according to a seventh exemplary embodiment of the present disclosure will be explained. In the seventh exemplary embodiment, the fifth and sixth exemplary embodiments are combined with the fourth exemplary embodiment. FIGS. 38 to 41 show schematic partial cross-sectional views of a workpiece unit according to the seventh exemplary embodiment. FIGS. 38 to 41 show one example according to the seventh exemplary embodiment respectively.

In the workpiece unit 100 shown in FIG. 38, the first positioning portion and the second positioning portion according to the fifth and sixth exemplary embodiments are applied to the configuration according to the fourth exemplary embodiment shown in FIG. 21. The first positioning portion 101h of the workpiece body 101 can be arranged on a fifth surface 101f of the protrusion 101c. The second positioning portion 102d of the holding member 102 can be arranged at a position corresponding to the first positioning portion 101h. The configurations of the first positioning portion 101h and the second positioning portion 102d can be the same as those of the fifth and sixth exemplary embodiments.

In a workpiece unit 110 shown in FIG. 39, the first positioning portion and the second positioning portion according to the fifth and sixth exemplary embodiments are applied to the configuration according to the fourth exemplary embodiment shown in FIG. 22. The first positioning portion 101h of the workpiece body 101 can be arranged on a fifth surface 101f of the protrusion 101c. The second positioning portion 112a of the holding member 112 can be arranged at a position corresponding to the first positioning portion 101h. The configurations of the first positioning portion 101h and the second positioning portion 112a can be the same as those of the fifth and sixth exemplary embodiments.

In a workpiece unit 120 shown in FIG. 40, the first positioning portion and the second positioning portion according to the fifth and sixth exemplary embodiments are applied to the configuration according to the fourth exemplary embodiment shown in FIG. 23. The first positioning portion 101h of the workpiece body 101 can be arranged on the fifth surface 101f of the protrusion 101c. The second positioning portion 122b of the holding member 122 can be arranged at a position corresponding to the first positioning portion 101h. The configurations of the first positioning portion 101h and the second positioning portion 122b can be the same as those of the fifth and sixth exemplary embodiments.

In a workpiece unit 130 shown in FIG. 41, the first positioning portion and the second positioning portion according to the fifth and sixth exemplary embodiments are applied to the configuration according to the fourth exemplary embodiment shown in FIG. 24. The first positioning portion 101h of the workpiece body 101 can be arranged on the fifth surface 101f of the protrusion 101c. The second positioning portion 132c of the holding member 132 can be arranged at a position corresponding to the first positioning portion 101h. The configurations of the first positioning portion 101h and the second positioning portion 132c can be the same as those of the fifth and sixth exemplary embodiments.

In each mode according to the seventh exemplary embodiment, the configuration is shown in which the first positioning portion of the workpiece body is the concave portion, and the second positioning portion of the holding member is the convex portion. Also in each mode according to the seventh exemplary embodiment, similarly to the sixth exemplary embodiment, the concave portion and the convex portion can be reversed between the workpiece body and the holding member. That is, the first positioning portion disposed at the protrusion of the workpiece body has a convex portion, and the second positioning portion disposed at the inner circumferential portion of the holding member can have a concave portion (not shown).

Although in each mode according to the seventh exemplary embodiment, the configuration is shown in which the first positioning portion of the workpiece body is arranged on the fifth surface of the protrusion, the first positioning portion may be arranged on at least one of the third surface and the fourth surface of the protrusion. The second positioning portion can be arranged at a position corresponding to the first positioning portion.

A method for producing the workpiece unit according to the seventh exemplary embodiment can be the same as the method for producing according to the first exemplary embodiment.

Other modes in the seventh exemplary embodiment than those described above can be the same as in the first to sixth exemplary embodiments. The seventh exemplary embodiment can be combined with at least one of the exemplary embodiments described above as far as possible.

According to the seventh exemplary embodiment, the same effects as those of the first to sixth exemplary embodiments can be obtained.

A workpiece unit according to an eighth exemplary embodiment of the present disclosure will be explained. In the first exemplary embodiment, the sections are physically separated from each other. In the eighth exemplary embodiment, at least two sections in a workpiece body are not physically separated and can be integrally formed. A schematic plan view and a schematic cross-sectional view of the workpiece unit according to the eighth exemplary embodiment can be the same as those in FIGS. 1 and 2.

It is preferable that the adjacent sections 11 are joined with each other. Therefore, it is preferable that a material of the adjacent sections 11 is such a material that can be bonded to each other by firing, and it is more preferable that the main materials are the same. For example, the adjacent sections 11 may be zirconia which is different in type and/or contents of additive such as colorants.

A method for producing a workpiece unit according to the eighth exemplary embodiment is the same as the method for producing described in the above exemplary embodiments except that a plurality of the sections 11 is integrally formed. Regarding molding of a workpiece, first, a mold having a desired shape of the section is formed by providing removable partitions in the mold. The partitions are located at boundaries of the sections. Next, after feeding the composition to an area of each section, the partition is removed. Next, a molded body in which a plurality of compositions is integrated can be formed by pressure-molding the compositions. A method performed after sintering (or firing) of the molded body is the same as in the above exemplary embodiments.

Other modes in the eighth exemplary embodiment than those described above can be the same as those according to the first to seventh exemplary embodiments. The eighth exemplary embodiment can be combined with at least one of the exemplary embodiments described above as far as possible.

According to the eighth exemplary embodiment, the same effects as those of the first to seventh exemplary embodiments can be obtained. In addition, members for holding a plurality of the sections, such as the holding member and the adhesive etc. are unnecessary.

A workpiece unit according to a ninth exemplary embodiment of the present disclosure will be explained. FIG. 42 shows a schematic plan view of a workpiece unit according to a ninth exemplary embodiment. FIG. 43 shows a schematic cross-sectional view of the workpiece unit along line XXXXIII-XXXXIII in FIG. 42. In the above exemplary embodiments, the workpiece unit has the holding member, but in the ninth exemplary embodiment, the workpiece unit 140 has no holding member.

A workpiece body 141 has a first surface 141c [sic. 141a], a second surface 141b and a protrusion 141c which replaces the holding member. A protrusion 141c is continuously arranged on an outer circumstantial portion of the workpiece body 141. The protrusion 141c may be a part of the workpiece body 141. It is preferable that each of the sections 151a to 151c has the protrusion 141c. A basic form of the protrusion 141c can be the same as the protrusion in the fourth exemplary embodiment. It is preferable that the width w31 of the protrusion 141c is equal to the width that can hold the workpiece unit 141 on the processing apparatus. A shape, size and position of the protrusion 141c can be the same as those of the holding member and/or the combinations of the holding member and the protrusion in the above exemplary embodiments.

The protrusion 141c can be formed, for example, by cutting a top end and a bottom end of the outer edge portion after fabricating the plate-like workpiece body.

Other modes in the ninth exemplary embodiment than those described above can be the same as in the first to eighth exemplary embodiments. The ninth exemplary embodiment can be combined with at least one of the exemplary embodiments described above as far as possible.

According to the ninth exemplary embodiment, the same effects as those of the first to eighth exemplary embodiments can be obtained. Further, the step of attaching the holding member can be omitted.

The disclosure of the Patent Literature as mentioned above is incorporated herein by reference thereto. It is to be noted that the workpiece unit and the method for producing according to the present invention are described based on the exemplary embodiments described above but they are not restricted thereto. Rather, it is possible for the workpiece unit and the production method to include various types of variations, changes or modifications or improvements of a wide variety of the disclosed elements (including the individual elements of the individual claims, the individual elements of the individual exemplary embodiments or examples, the individual elements of the individual figures etc.) within the entire disclosure of the present invention (including Claims and Drawings) and based on the basic technical concept of the present invention. Further, various combinations, replacements and selections of the various disclosed elements (including, for example, each element in the Claims, each element in the exemplary embodiments and examples and each element in the drawings) are possible within the entire disclosure of the present invention.

Further problems, objectives and developments of the present invention are apparent from the entire disclosure of the present invention including Claims.

With respect to numerical values and ranges disclosed in the present application, it should be interpreted that all numerical values or small ranges included in the ranges are specifically disclosed even if there are no explicit disclosure.

A part or all of the above described exemplary embodiments may also be expressed as following remarks (termed as "mode" or "modes"), but not restricted thereto.

[Mode 1]
A workpiece unit, comprising:
a workpiece body having a protrusion, and
a holding member arranged on at least a part of an outer side of the protrusion.

[Mode 2]
The workpiece unit according to the Mode, wherein
the workpiece body has a plate shape,
the protrusion protrudes from a side surface of the workpiece body, and
the holding member is arranged at least in a protruding direction of the protrusion.

[Mode 3]
The workpiece unit according to the Mode(s), wherein
the workpiece body has a first surface, a second surface arranged on a side opposite to the first surface and an outer circumferential portion provided between the first surface and the second surface, and
the protrusion is arranged on the outer circumferential portion.

[Mode 4]
The workpiece unit according to the Mode(s), wherein
the protrusion is arranged continuously along the outer circumferential portion of the workpiece body, and
the holding member has a ring shape.

[Mode 5]
The workpiece unit according to the Mode(s), wherein
the protrusion has a third surface directed in the same direction as the first surface, a fourth surface directed in the same direction as the second surface and a fifth surface connecting the third surface and the fourth surface, and
the holding member covers at least a part of the fifth surface.

[Mode 6]
The workpiece unit according to the Mode(s), wherein
the holding member has a first surface directed in the same direction as the third surface of the protrusion and a second surface directed in the same direction as the fourth surface of the protrusion.

[Mode 7]
The workpiece unit according to the Mode(s), wherein
the first surface of the holding member forms the same plane as the third surface of the protrusion or exists on a side closer to the first surface of the workpiece body than the third surface of the protrusion.

[Mode 8]
The workpiece unit according to the Mode(s), wherein
the second surface of the holding member forms the same plane as the fourth surface of the protrusion or exists on a side closer to the second surface of the workpiece body than the fourth surface of the protrusion.

[Mode 9]
The workpiece unit according to the Mode(s), wherein
the holding member further covers at least a part of the third surface and the fourth surface of the protrusion.

[Mode 10]
The workpiece unit according to the Mode(s), wherein
the workpiece body has at least one first positioning portion in a portion of the protrusion which faces the holding member, and
the holding member has a second positioning portion that engages with at least a part of the first positioning portion.

[Mode 11]
A workpiece unit, comprising:
a workpiece body and
a holding member arranged on at least a part of an outer circumferential portion of the workpiece body, wherein
the workpiece body has at least one first positioning portion in a portion which faces the holding member, and
the holding member has a second positioning portion that engages with at least a part of the first positioning portion.

[Mode 12]
The workpiece unit according to the Mode, wherein
the first positioning portion has a concave or convex shape,
the second positioning portion has a shape which fits with the first positioning portion, and
at least a part of one of the first positioning part and the second positioning part is fitted with at least a part of the other.

[Mode 13]
The workpiece unit according to the Mode(s), wherein
the first positioning portion is arranged over the entire circumference of the workpiece body.

[Mode 14]
The workpiece unit according to the Mode(s), wherein
the first positioning portion or the second positioning portion has a groove shape.

[Mode 15]
The workpiece unit according to the Mode(s), wherein
the first positioning portion or the second positioning portion has a conical or columnar shape.

[Mode 16]
The workpiece unit according to the Mode(s), wherein
the workpiece body has a protrusion protruding from the outer circumferential portion,
the first positioning portion is arranged at the protrusion, and
the holding member is arranged at least in a protruding direction of the protrusion.

[Mode 17]
The workpiece unit according to the Mode(s), wherein
the protrusion is arranged continuously along the outer circumferential portion of the workpiece body, and
the holding member has a ring shape.

[Mode 18]
The workpiece unit according to the Mode(s), wherein
the workpiece body has a first surface and a second surface arranged on a side opposite to the first surface,
the outer circumferential portion is arranged between the first surface and the second surface,
the protrusion has a third surface directed in the same direction as the first surface, a fourth surface directed in the same direction as the second surface and a fifth surface connecting the third surface and the fourth surface, and the holding member covers at least a part of the fifth surface.

[Mode 19]
The workpiece unit according to the Mode(s), wherein
the holding member is composed of two or more parts.

[Mode 20]
The workpiece unit according to the Mode(s), wherein
each of parts of the holding member has a concave portion or a convex portion respectively, and
the parts are arranged so as to fit together with the concave portion and the convex portion.

[Mode 21]
The workpiece unit according to the Mode(s), wherein
the workpiece body is ceramic, metal or resin.

[Mode 22]
The workpiece unit according to the Mode(s), wherein
the workpiece body is a pre-sintered body in which the zirconia crystal grains are not completely sintered.

[Mode 23]
The workpiece unit according to the Mode(s), wherein
the protrusion is a part of the pre-sintered body.

[Mode 24]
The workpiece unit according to the Mode(s), wherein
the holding member is bonded to the workpiece body by an adhesive.

[Mode 25]
The workpiece unit according to the Mode(s), wherein
the holding member and the workpiece body are in direct contact with each other.

[Mode 26]
The workpiece unit according to the Mode(s), wherein
the holding member is plastic.

[Mode 27]
The workpiece unit according to the Mode(s), wherein
the protrusion has a thickness substantially the same as that of the holding member.

[Mode 28]
The workpiece unit according to the Mode(s), wherein
the protrusion has a width of 0.3 mm to 2 mm in the protruding direction.

[Mode 29]
The workpiece unit according to the Mode(s), wherein
the protrusion is arranged at a central area in the thickness direction of the workpiece body.

[Mode 30]
The workpiece unit according to the Mode(s), wherein
the workpiece body is formed by processing the workpiece body and has a worked item connected to the protrusion or the outer edge portion of the workpiece body.

[Mode 31]
A method for producing a workpiece unit, comprising:
preparing a workpiece body having a first positioning portion on an outer circumferential portion,
preparing a holding member having a second positioning portion, and
mounting the holding member to the outer circumferential portion of the workpiece body so as to correspond the first positioning portion to the second positioning portion.

[Mode 32]
The method for producing the workpiece unit according to the Mode, wherein
the first positioning portion is a concave portion or convex portion, and
in the mounting the holding member, the first positioning portion and the second positioning portion are fitted with each other.

[Mode 33]
A method for producing a workpiece unit, comprising:
preparing a workpiece body having a protrusion on an outer circumferential portion,
preparing a holding member, and
mounting the holding member on the outer side of the protrusion.

[Mode 34]
The method for producing the workpiece body according to the Mode(s), wherein
the mounting the holding member comprises:
expanding the holding member having a ring shape by heating,
inserting the workpiece body into a ring of the holding member, and
shrinking the holding member by cooling.

[Mode 35]
The method for producing the workpiece body according to the Mode(s), wherein
the workpiece body has a protrusion protruding from the outer circumferential portion, and
the first positioning portion is arranged at the protrusion.

INDUSTRIAL APPLICABILITY

The present disclosure can be applied, for example, to the production of a dental prosthesis.

REFERENCE SIGNS LIST 10, 20, 30, 40, 50, 60, 70, 80, 90, 100, 110, 120, 130, 140 Workpiece unit
1, 41, 81, 91, 101, 141 Workpiece body
1a, 41a, 81a, 91a, 101a, 141a First surface
1b, 41b, 81b, 91b, 101b, 141b Second surface
1c, 41g, 81c, 91c Outer circumferential portion
1d, 81d, 91f, 101h First positioning portion
1e Outer edge
2, 52, 62, 72, 82, 92, 102, 112, 122, 132 Holding member
2a, 62a, 82a, 92a, 102a, 122a First surface
2b, 82b, 92c, 102b Second surface
2c, 82c, 92c, 102c Inner circumferential portion
82d, 92f, 102d, 112a, 122b, 132c Second positioning portion
3 Adhesive
4 Worked item
4a Connecting portion
5 Cutting portion
6 Cushioning material
11 Section
11a to 11f First to Sixth Section
11g Concave portion
11h Convex portion
12, 13 Covering member
21, 22 Section unit
23 Section (Workpiece body)
24 Adhesive
31, 34 Dummy workpiece body
31a, 34a Holding portion
41c, 101c, 141c Protrusion
41d, 101d Third surface
41e, 101e Fourth surface
41f, 101f Fifth surface
42a to 42d First to Fourth section
43 Adhesive
72a, 132a First portion
72b, 132b Second portion
151a to 151c Section

The invention claimed is:

1. A workpiece unit, comprising a workpiece body having a plurality of sections which divide processing surfaces of the workpiece body; and a cushioning material arranged between adjacent sections, wherein:
   the workpiece body has a first surface dedicated as a processed surface, a second surface arranged on a side opposite to the first surface and a protrusion arranged on an outer circumferential portion provided between the first surface and the second surface,
   the workpiece body is integral with the protrusion and is the same material as the protrusion,
   each section of said plurality of sections is physically, separably combined with other adjacent sections, and
   the cushioning material is made of a material different from that of the plurality of sections.

2. The workpiece unit according to claim 1, wherein the plurality of the sections has a different composition respectively.

3. The workpiece unit according to claim 1, further comprising a holding member surrounding at least an outer circumferential portion of the workpiece body.

4. The workpiece unit according to claim 3, wherein the holding member is arranged at a central area in a thickness direction of the workpiece body.

5. The workpiece unit according to claim 3, wherein the holding member is plastic.

6. The workpiece unit according to claim 3, wherein
   the workpiece body has at least one first positioning portion in a portion facing the holding member, and
   the holding member has a second positioning portion that engages with at least a part of the first positioning portion.

7. The workpiece unit according to claim 6, wherein the first positioning portion or the second positioning portion has a groove shape or a conical shape or a columnar shape.

8. The workpiece unit according to claim 3, wherein the holding member is bonded to the workpiece body by an adhesive, or the holding member and the workpiece body are in direct contact with each other.

9. The workpiece unit according to claim 1, wherein a planar shape of the sections has a sector shape.

10. The workpiece unit according to claim 1, wherein one of the sections is a portion which is not processed by a processing apparatus.

11. The workpiece unit according to claim 1, wherein the workpiece body is ceramic, metal or resin.

12. The workpiece unit according to claim 1, wherein the workpiece body is a pre-sintered body in which zirconia crystal grains are not completely sintered.

13. The workpiece unit according to claim 1, wherein the workpiece body has a worked item which is formed by processing the workpiece body and connected to a protrusion or an outer edge portion of the workpiece body.

14. The workpiece unit according to claim 1, wherein a first section of said plurality of sections has a convex portion on a surface facing an adjacent second section; and the second section has a concave portion that engages with the convex portion of the first section.

* * * * *